United States Patent [19]

Yamamoto et al.

[11] Patent Number: 5,244,979
[45] Date of Patent: Sep. 14, 1993

[54] PIGMENT DISPERSING AGENT

[75] Inventors: Toshio Yamamoto, Yokohama; Hisao Ogawa, Zushi; Toshiya Kitamura; Yoshiaki Matsukura, both of Yokohama, all of Japan

[73] Assignee: Nippon Oil and Fats Company, Limited, Tokyo, Japan

[21] Appl. No.: 691,510

[22] Filed: Apr. 25, 1991

[30] Foreign Application Priority Data

May 2, 1990 [JP] Japan .................................. 2-115279
Nov. 30, 1990 [JP] Japan .................................. 2-330600
Apr. 23, 1991 [JP] Japan .................................. 3-117941

[51] Int. Cl.$^5$ ............................................. C08G 75/04
[52] U.S. Cl. .................................. 525/329.7; 252/356; 252/357; 525/329.9; 525/260; 525/263; 525/301; 525/302; 525/306; 525/312
[58] Field of Search ................... 525/329.7, 329.9; 526/260, 263, 301, 302, 306, 312; 252/356, 357

[56] References Cited

U.S. PATENT DOCUMENTS 4,894,263 1/1990 Dubois et al. .................... 525/329.7

FOREIGN PATENT DOCUMENTS 0180051 10/1985 European Pat. Off. .
0323847 1/1989 European Pat. Off. .
358358 8/1989 European Pat. Off. .
0365020 10/1989 European Pat. Off. .
WO8810148 12/1988 PCT Int'l Appl. .

Primary Examiner—Maurice J. Welsh
Attorney, Agent, or Firm—Stevens, Davis, Miller & Mosher

[57] ABSTRACT

A pigment dispersing agent for paints is constituted with a particular acrylic polymer component having a tertiary amino group and/or a nitrogen-containing heterocyclic ring and a particular polyester component, and has particular number average molecular weight and amine value. This pigment dispersing agent is applicable to both acrylic resin series and polyester resin series paints as well as thermosetting type paints.

8 Claims, No Drawings

PIGMENT DISPERSING AGENT

BACKGROUND OF THE INVENTION

1. Field of the Invention

This invention relates to a pigment dispersing agent used when a pigment is mixed with a coating composition in the manufacture of paints.

2. Related Art Statement

In the manufacture of paints, it is an important factor to mix a pigment with a coating composition. In this case, the pigment to be usually used in the paint is dispersed into only a part of a vehicle constituting the paint together with a proper solvent, diluent or other additives by means of a mill used in the paint industry to form a dispersion paste. Then, the resulting paste is mixed with the remaining amount of the vehicle and another necessary additives to obtain a pigment dispersing composition as a paint. However, a greatest problem of such a pigment dispersing composition lies in that pigment particles are apt to be agglomerated. Such an agglomeration may occur in dispersing step, dissolving step, storing step or painting step. As a result, it is known to cause unfavorable phenomena such as decrease of paint stability, occurrence of troubles in the painting, reductions of color strength, gloss and distinctness of image in the finally obtained paint film, flooding, floating, color change with time and the like. Such a phenomenon that the pigment particles are apt to be agglomerated is explained by London-van der Waals force attracting the particles each other. In order to overcome such an attracting force, it is necessary to provide an adsorption layer onto the surface of the particle, and consequently many pigment dispersing agents and grinding aids are proposed and various methods of improving pigment dispersion are attempted. For instance, there are known (1) a method of dispersing the pigment with a non-ionic, anionic or cationic surfactant, or a wetting agent such as aliphatic polyvalent carboxylic acid or the like as an assistant; (2) a method of dispersing the pigment with an ampholytic substance obtained by reacting a substance having an affinity with a pigment with a substance having a solvent affinity as disclosed in British Patent No. 1,108,261, No. 1,159,252 and No. 1,346,298; (3) a method of decreasing surface tension with a surfactant such as alkyl silicone to prevent the floating; (4) a method of mixing the pigment with a certain substituted derivative of the pigment to conduct pigment dispersion as disclosed in Japanese Patent laid open No. 51-18736; (5) a method of using as a dispersing agent a compound obtained by reacting an organic compound having two or more isocyanate groups, an organic compound having one or more functional group to be reacted with isocyanate group (amino group, hydroxyl group) and a polymer having substantially one functional group to be reacted with isocyanate group as disclosed in U.S. Pat. No. 3,684,711 and British Patent No. 1,393,401; (6) a method of dispersing the pigment with a high molecular weight dispersing agent obtained by reacting a basic substance with a polyester compound as disclosed in EP-A-0208041, Japanese Patent laid open No. 60-166318 and No. 61-174939, and U.S. Pat. No. 4,933,417; (7) a method of dispersing the pigment with a high molecular weight dispersing agent obtained by reacting a basic substance with an acrylic polymer as disclosed in Japanese Patent laid open No. 46-7294; (8) a method of dispersing the pigment with a high molecular weight dispersing agent obtained by reacting a basic substance with an acrylic polymer and a polyester compound as disclosed in EP-A-0358358; and the like.

In the grinding aids or dispersing agents used in the above methods (1)-(3), however, the adsorption layer adsorbed on the particle surface is thin and does not develop a satisfactory stabilizing effect and hence the pigment dispersing performances are not improved. The pigment derivative used in the method (4) is naturally colored, so that it can not generally be used for various pigments. The fundamental thought of the pigment dispersing agent used in the methods (5)-(8) is a technical idea of making a block structure comprised of a polymer portion capable of solvating with a solvent and an anchor portion adsorbed on the pigment as described by A. Topham in Progress in Organic Coatings, vol. 5, (1977) pp 237-243. In case of utilizing such a technique, it is important that the polymer portion capable of solvating with the solvent is excellent in the compatibility with a resin used as a film forming component of the paint film and that the number of adsorption points to the pigment is increased and the adsorption state of the dispersing agent to the pigment is rendered into a tail-like state, whereby an effective steric repulsion layer is formed in the polymer portion of the dispersing agent adsorbed on the pigment to stabilize the dispersed particles, and the like. If the polymer portion solvating with the solvent is poor in the compatibility with the resin added as the film forming component of the paint film, the solvated polymer portion agglomerates to cause the degradation of pigment dispersing performances. Furthermore, when the number of adsorption points to the pigment is small, the resorption of the dispersing agent from the pigment is easily caused to degrade the pigment dispersing performances, while if the adsorption state of the dispersing agent to the pigment is loop, the formation of the steric repulsion layer in the solvated polymer portion is insufficient and the degradation of pigment dispersing performances is caused. In the method (5), the polyester compound made from dialcohol and dicarboxylic acid starting from monoalcohol is used, which includes many compounds such as polyester compound having substantially one hydroxyl group in its terminal, polyester compound having hydroxyl groups in both terminals, polyester compound containing no hydroxyl group. When the dispersing agent is made by using such a polyester compound, the adsorption state to the pigment is tail or loop and hence the satisfactory pigment dispersing performances are not obtained. In the pigment dispersing agent obtained by the method (6), when the dispersing agent is good in the compatibility with the resin added as a film forming component of the paint film, the considerable improvement of the pigment dispersing performances is observed, but when it is poor in the compatibility with the resin, the protection layer of the dispersing agent adsorbed on the pigment agglomerates to undesirably degrade the pigment dispersing performances. Particularly, since a dispersing agent consists mainly of the polyester compound, it is poor in the compatibility with an acrylic resin or the like being important as a painting resin, so that it is difficult to obtain good pigment dispersing performances in case of acrylic resin series paints. In the dispersing agent obtained by the method (7), since an acrylic resin is used in the polymer portion, it acts as a dispersing agent for usual acrylic resin series paints, but it is difficult to provide good pigment dispersing performances in case of polyester series paints because the compatibility with the polyester resin or the like is poor. In the dispersing agent obtained by the method (8), almost of the aforementioned problems are solved, but the yellowing is undesirably caused at the curing in case of thermosetting resin type paints.

SUMMARY OF THE INVENTION

Under the above circumstances, the inventors have made various studies with respect to a method of providing adsorption points onto a pigment and effectively incorporating a polymer component into a pigment dispersing agent so as to have excellent compatibility with acrylic resin and polyester resin frequently used in the art and pigment dispersing performances and also the development of pigment dispersing agent causing no yellowing even when being applied to thermosetting type paints, and as a result the invention has been accomplished.

DESCRIPTION OF THE PREFERRED EMBODIMENTS

That is, the invention provides the following first, second and third pigment dispersing agents.

The first pigment dispersing agent according to the invention is represented by the following general formula (I) or (II):

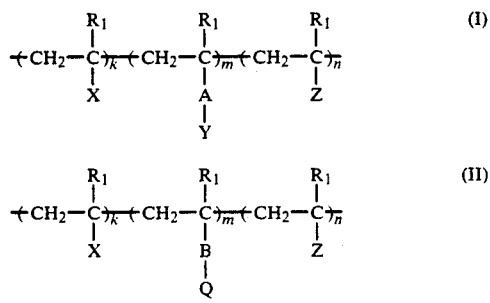

wherein $R_1$ is a hydrogen atom or a methyl group, X is a tertiary amino group and/or a nitrogen-containing heterocyclic ring group selected from

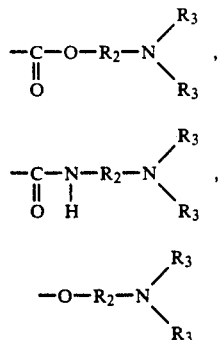

wherein $R_2$ is an alkylene group having a carbon number of 1-8, and $R_3$ is an alkyl group having a carbon number of 1-4, an imidazole group, a pyridine group, a carbazole group, a quinoline group and an N-alkyl piperidine group, each of A and B is an organic bonding group, each of Y and Q is a polyester compound residue and/or a polyester polyether compound residue, Z is a hydrogen atom, an alkyl group having a carbon number of 1-4, a halogen atom, a phenyl group, a nitrile group,

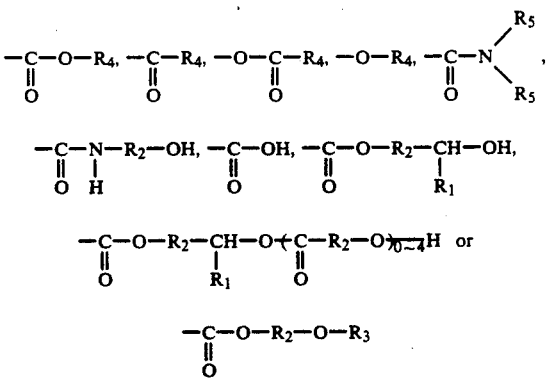

wherein $R_4$ is an alkyl group having a carbon number of 1-18, $R_5$ is a hydrogen atom, or an alkyl group or an alkoxy group having a carbon number of 1-4, k is an integer of 1-200, m is an integer of 1-100 and n is an integer of 0-200, and has a number average molecular weight of 1,000-100,000 and an amine value of 10-200 mgKOH/g.

In the first pigment dispersing agent, as to the range of k in the formulae (I) and (II), when k exceeds 200, the adsorption group to the pigment is too long and may act as an agglomerating agent and hence the degradation of the pigment dispersing performances may undesirably be caused.

Then, A in the formula (I) is an organic bonding group represented by the following general formula (1), (2) or (3):

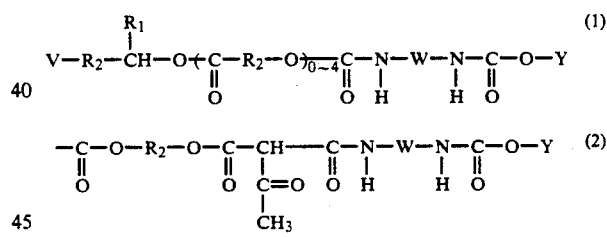

wherein V is $$-\underset{\underset{O}{\|}}{C}-O, \quad -\underset{\underset{O}{\|}}{C}-\underset{\underset{H}{|}}{N}- \text{ or } -O-,$$

W is a residue of diisocyanate compound and $R_6$ is a residue of acid anhydride having a carbon number of 2-6, and B in the formula (II) is an organic bonding group represented by the following general formula (4) or (5)

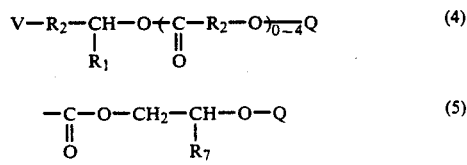

wherein $R_7$ is a phenyl group, or an alkyl group or an aromatic group having a carbon number of 3-19,

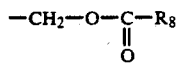

wherein $R_8$ is an alkyl group or an aromatic group having a carbon number of 3-18 or —CH$_2$—O—R$_9$ wherein $R_9$ is an alkyl group or an aromatic group having a carbon number of 1-18.

In the formula (I), Y is a residue of a polyester polyether compound obtained by ring-opening copolymerization of a lactone compound and a monoepoxy compound using monovalent alcohol and/or monocarboxylic acid as an initiator, and having a number average molecular weight of 500-20,000 and/or a residue of a polyester compound obtained by ring-opening copolymerization of a lactone compound, a monoepoxy compound and an acid anhydride using monovalent alcohol and/or monocarboxylic acid as an initiator, and having a number average molecular weight of 500-20,000, and may have block structure represented by the following formulae (6)-(10) as well as a structure of polymer residue containing randomly bonded various components:

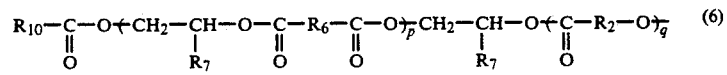 (6)

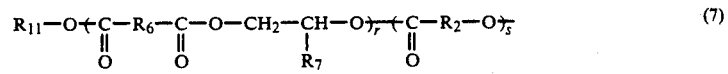 (7)

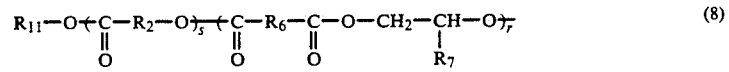 (8)

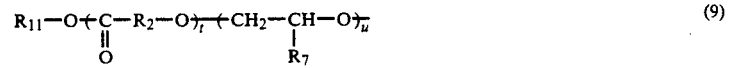 (9)

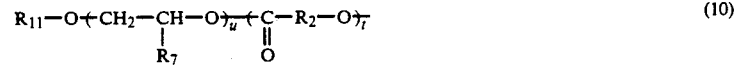 (10)

(wherein $R_{10}$ is an alkyl group or an aromatic group having a carbon number of 1-20 and $R_{11}$ is a saturated aliphatic, alicyclic or aromatic group having a carbon number of 1-18).

In the formula (II), Q is a residue of a polyester polyether compound obtained by ring-opening copolymerization of a lactone compound and a monoepoxy compound and having a number average molecular weight of 500-20,000 and/or a residue of a polyester compound obtained by ring-opening copolymerization of a lactone compound, a monoepoxy compound and an acid anhydride and having a number average molecular weight of 500-20,000, and may have block structure represented by the following formulae (11)-(14) as well as a structure of polymer residue containing randomly bonded various components:

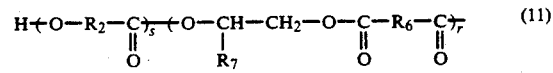 (11)

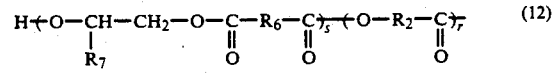 (12)

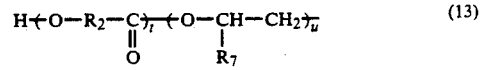 (13)

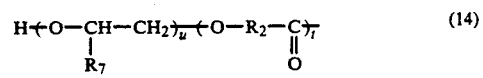 (14)

When the number average molecular weight in the compound having the above Y group (hereinafter referred to as component Y) and the compound having the above Q group (hereinafter referred to as component Q) is less than 500, the sufficient formation of the steric repulsion layer is difficult and the stable pigment dispersing performances are degraded. On the other hand, when the number average molecular weight exceeds 20,000, it is difficult to produce these components with a good reproducibility and hence the components are not practical as an industrial material.

As to the ranges of m and n in the formulae (I) and (II), when m exceeds 100 and n exceeds 200, respectively, the molecular weight becomes too higher and the pigment dispersing performances undesirably lower.

The second pigment dispersing agent according to the invention is a product obtained by reacting an acrylic polymer having a tertiary amino group concentration of 0.9-18 mol/kg, an active hydrogen concentration of 0.18-9.0 mol/kg and/or an active methylene group concentration of 0.18-9.0 mol/kg and a number average molecular weight of 800-30,000 (hereinafter referred to as component S) with a polymer compound having one isocyanate group in its terminal and a number average molecular weight of 500-20,000 obtained through a reaction of a ring-opened copolymer between lactone compound having a carbon number of 3-17 and monoepoxy compound using monovalent alcohol as an initiator, a ring-opened copolymer among lactone compound, monoepoxy compound and acid anhydride using monovalent alcohol and/or monocarboxylic acid as an initiator and a diisocyanate compound (hereinafter referred to as component T) at a mol ratio of component S to component T of 1:1-1:40, and has a number average molecular weight of 1,000-100,000, a sum of hydroxyl value and active methylene value of 5-200 mgKOH/g and an amine value of 10-200 mgKOH/g.

In the component S, when the tertiary amino group concentration is less 0.9 mol/kg, the adsorption force to the pigment is weak and the dispersing performance is degraded. While, when it exceeds 18 mol/kg, the water resistance and weather resistance of the resulting paint film are damaged. When the number average molecular weight is less than 800, the adsorption force is lacking and the dispersing performance is degraded. While, when it exceeds 30,000, the adsorption group is too long and may act as an agglomerating agent and hence the pigment dispersing performances are degraded. The active hydrogen group and/or active methylene group in the component S forms a crosslinking point in the paint film and provides a bonding point to the component T, so that when the concentration of each of the active hydrogen group and active methylene group is less than 0.18 mol/kg, the steric stability is lacking and the dispersing stability lowers, while when it exceeds 9.0 mol/kg, the pigment dispersing agent is apt to be desorbed from the surface of the pigment and the dispersing performance undesirably lowers.

As mentioned above, the second pigment dispersing agent is constituted with the components S and T and obtained by reacting these components S and T at a mol ratio of 1:1–1:40. However, when the mol ratio of S/T is less than 1:1, the steric repulsion layer is not sufficiently formed and the pigment dispersing performances are degraded, while when it exceeds 1:40, the desorption from the pigment surface is apt to be caused, and the dispersion performance lowers.

The second pigment dispersing agent consists of the component S and the component T bonded by reacting the active hydrogen and/or active methylene group in the component S with the isocyanate group in the component T. The bonded state is illustrated below when the reaction group of the component S is hydroxyl group:

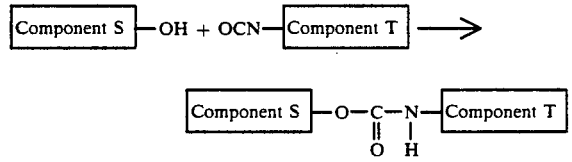

Furthermore, it is illustrated below when the reaction group of the component S is active methylene group:

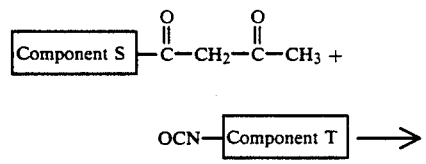

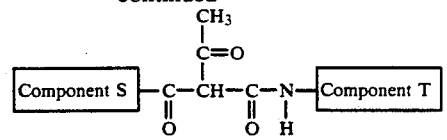

Since the second pigment dispersing agent is a reaction product between the component S and the component T as mentioned above, it is desirable that the sum of hydroxyl value and active methylene value in the pigment dispersing agent itself is within a range of 5–200 mgKOH/g. When the sum of hydroxyl value and active methylene value is less than 5 mgKOH/g, the amount of the pigment dispersing agent to be crosslinked with a crosslinking agent in the film forming component of the paint film is lacking, so that it is not fixed in the paint film through the crosslinking reaction but may serve as a plasticizer to injury the performances of paint film, particularly humidity resistance, water resistance and weather resistance and the like. Further more, when being used to multi-painting specification, troubles in the adhesion between the paint films may be caused. On the other hand, when the sum of hydroxyl value and active methylene value exceeds 200 mgKOH/g, the polarity becomes too high and hence the water resistance and flexibility of the paint film are degraded and the pigment dispersing performances are lowered.

The third pigment dispersing agent according to the invention is a copolymer having a number average molecular weight of 1,000–100,000 and an amine value of 10–200 mgKOH/g, which is obtained by copolymerizing (a) 40–97% by weight of a macromer having vinyl group or isopropenyl group in its terminal and a number average molecular weight of 500–20,000 obtained by blocking a half of (i) a polymer compound having one hydroxyl group in its terminal with (ii) a diisocyanate compound and then blocking the remaining half of the polymer compound with (iii) a hydroxyl group containing polymerizable monomer and/or an active methylene group containing polymerizable monomer with (b) 3–60% by weight of a tertiary amino group containing copolymerizable monomer and/or a copolymerizable monomer having nitrogen-containing heterocyclic ring with a basicity and (c) 0–47% by weight of copolymerizable monomer other than the above components (a) and (b), in which the above polymer compound (i) having one hydroxyl group in its terminal is a polymer compound represented by the following general formula (III), (IV) or (V):

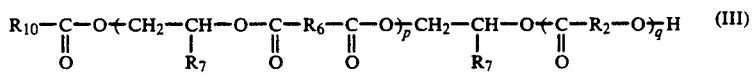

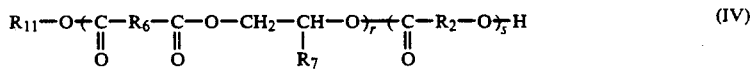

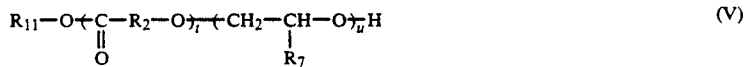

(wherein $R_{10}$ is an alkyl group or an aromatic group having a carbon number of 1–20, $R_{11}$ is a saturated aliphatic, alicyclic or aromatic group having a carbon number of 1–18, p and q are $1 \leq p+1 \leq 200$, r and s are $1 \leq r+s \leq 200$, and t and u are $1 \leq t+u \leq 200$).

When the number average molecular weight of the component (a) is less than 500, the sufficient formation of the steric repulsion layer is difficult and the pigment dispersing performances lower. While, when the number average molecular weight exceeds 20,000, the component (a) is difficult to be produced with a good reproducibility and is not practical as an industrial material. Furthermore, when the amount of the component (a) exceeds 97% by weight, it is considered that the adsorption force to the pigment surface is lower than an affinity of the polymer component (a) with the resin added as a film forming component of the paint film, so that the desorption of the pigment dispersing agent from the pigment surface is caused and hence the pigment dispersing performances undesirably lower. While, when it is less than 40% by weight, the polymer component (a) is lacking for the sufficient formation of the steric repulsion layer and hence the pigment dispersing performances undesirably lower.

As the component (b), the tertiary amino group containing copolymerizable monomer and/or the copolymerizable monomer having a nitrogen-containing heterocyclic ring with a basicity are necessary to be compounded in an amount of 3–60% by weight.

When the amount of the component (b) is less than 3% by weight, the adsorption force to the pigment is weak and the pigment dispersing performances considerably lower, while when it exceeds 60% by weight, the properties of paint film such as water resistance, weather resistance, adhesion property and the like are undesirably degraded.

Furthermore, the copolymerizable monomer other than the above components (a) and (b) may be compounded in an amount of 0–47% by weight as the component (c).

When the amount of the component (c) exceeds 47% by weight, the ratio of the macromer as the component (a) in the pigment dispersing agent becomes lower and hence the steric repulsion layer is not sufficiently formed and the degradation of the pigment dispersing performances is undesirably caused.

When the number average molecular weight in each of the first, second and third pigment dispersing agents according to the invention is less than 1,000, the polymer component of the pigment dispersing agent adsorbed on the pigment surface can not develop the satisfactory effect as the steric repulsion layer and creates a phenomenon such as reagglomeration of dispersed particles or caking thereof to undesirably cause the remarkable degradation of the pigment dispersing performances. If it is intended to render the number average molecular weight into more than 100,000, it is difficult to produce the pigment dispersing agent with a good reproducibility and the pigment dispersing agent may inversely act as an agglomerating agent.

Therefore, the number average molecular weight is required to be within a range of 1,000–100,000 in the pigment dispersing agent according to the invention.

Furthermore, when the amine value in the pigment dispersing agent according to the invention is less than 10 mgKOH/g, the adsorption force onto the pigment surface is poor but the affinity with the resin added as a film forming component is good, so that the desorption of the pigment dispersing agent from the pigment surface is caused to undesirably degrade the pigment dispersing stability, while when it exceeds 200 mgKOH/g, the ratio of the steric repulsion layer to the portion of the pigment dispersing agent adsorbed on the pigment surface becomes too small and hence the sufficient pigment dispersing stability is not obtained and the properties of paint film such as water resistance, weather resistance, adhesion property and the like are undesirably degraded.

Therefore, the amine value in the pigment dispersing agent according to the invention is required to be within a range of 10–200 mgKOH/g.

Moreover, the term "active hydrogen" used herein means a hydrogen atom directly bonded to oxygen, sulfur, nitrogen or the like and having a reactivity larger than that of hydrogen directly bonded to carbon, and the term "active methylene" means a methylene group in which alfa-hydrogen atom is adjacent to too or more carbonyl groups and/or nitrile groups and has a large reactivity.

The active methylene value is calculated from an amount of KOH required for the neutralization in a mixed solvent of dioxane and isopropyl alcohol with an alcoholate of KOH as a titrating reagent through potential difference titration, and the amine value is calculated from an amount of p-toluene sulfonic acid required for the neutralization in a solvent of acetic acid with a solution of p-toluene sulfonic acid in acetic acid through anhydrous potential difference titration.

Furthermore, the number average molecular weight in the components Y, Q, S, T and (a) is measured by gel permeation chromatography using tetrahydrofuran as a developing solvent, and the number average molecular weight of the pigment dispersing agent is measured by gel permeation chromatography using dimethyl formamide as a developing solvent.

In the pigment dispersing agent according to the invention, the tertiary amino group and/or nitrogen-containing heterocyclic ring group with the basicity included in each of the component X according to the first invention and the components S and (b) according to the second invention has a excellent adsorbing effect to the pigment surface, and the polyester compound residue and/or polyester polyether compound residue in the components Y and Q according to the first invention and the components T and (c) according to the second invention form a sufficient steric repulsion layer on the pigment surface in an organic solvent, whereby the reagglomeration of pigment particles is prevented and the improved dispersing stability can be provided to the pigment dispersing agent composition. Furthermore, the pigment dispersing agent according to the invention has polyester structure and acryl structure in its molecule, so that it exhibits an excellent compatibility with both polyester resin and acrylic resin and can be used to both acrylic resin series and polyester resin series paints without causing reagglomeration of pigment particles.

Moreover, in the pigment dispersing agent according to the invention, the tertiary amino group and/or the nitrogen-containing heterocyclic ring with the basicity is an adsorption point to the pigment surface so that even when it is used in the thermosetting paint, there is caused no yellowing of paint film during the baking and curing.

The production of the pigment dispersing agent according to the invention will be described in detail below.

In the first pigment dispersing agent, there are the following two methods for the pigment dispersing agent of the formula (I).

In the first method, at least one monocarboxylic or aromatic monocarboxylic acid represented by $R_{10}$—COOH ($R_{10}$ is an alkyl group having a carbon number of 1-20) is first used as an initiator, and then at least one monoepoxy compound represented by the following formula (15):

($R_7$ is a phenyl group, or an alkyl group or an aromatic group having a carbon number of 3-19), at least one acid anhydride represented by the following formula (16):

($R_6$ is a residue of acid anhydride having a carbon number of 2-6) and at least one lactone represented by the following formula (17):

($R_2$ is an alkylene group having a carbon number of 1-8) are subjected to a ring-opening addition reaction at a temperature of 100° C.-200° C., preferably 120° C.-160° C. to form a polyester compound having one hydroxyl group in its terminal.

As the monocarboxylic or aromatic monocarboxylic acid, use may be made of acetic acid, propionic acid, caprilic acid, nonanoic acid, capric acid, lauric acid, myristic acid, palmitic acid, stearic acid, isononanoic acid, 2-ethyl hexanoic acid, arachic acid, benzoic acid, p-tert-butyl benzoic acid and the like. As the monoepoxy compound of the formula (15), use may be made of styrene oxide having phenyl group; phenyl glycidyl ether, p-tolyl glycidyl ether, n-butyl glycidyl ether and dibromocresyl glycidyl ether, each containing an alkyl group or aromatic group with a carbon number of 4-19; glycidyl ester of lauric acid, glycidyl ester of stearic acid, glycidyl ester of versatic acid and glycidyl ester of p-tert-butyl benzoic acid, each containing an alkyl group or aromatic group with a carbon number of 3-17 and glycidyl ester group; α-olefin oxide and the like containing an alkyl group with a carbon number of 5-10. As the acid anhydride of the formula (16), use may be made of phthalic anhydride, succinic anhydride, phthalic anhydride hexahydride, phthalic anhydride tetrabromide, phthalic anhydride tetrachloride, 3,6-endomethylene tetrahydrophthalic anhydride, maleic anhydride, chlorendic anhydride and the like. As the lactone of the formula (17), use may be made of ε-caprolactone, β-propione lactone, δ-valerolactone and the like.

In this case, there may be used a method wherein the monoepoxy compound and the acid anhydride are ring-opening polymerized with the monocarboxylic acid as an initiator and then subjected to ring-opening addition reaction with the lactone to form a polymer of block structure, and a method wherein the monoepoxy compound, acid anhydride and lactone are randomly reacted with the monocarboxylic acid as an initiator to form a polymer of random structure.

A solvent used in the above reaction is not particularly restricted. As the solvent, mention may be made of aromatic hydrocarbons such as toluene, xylene, ethylbenzene, Solveso #100 (registered trade mark, made by Exxon Chemical Co.), Solveso #150 (registered trade mark, made by Exxon Chemical Co.), turpentine oil, tetrline and the like; aliphatic hydrocarbons such as n-hexane, cyclohexane, methyl cyclohexane, n-heptane, n-octane, n-decane, mineral spirit, isooctane, nonane, trimethyl hexane, solvent naphtha, Isoper (registered trade mark, made by Exxon Chemical Co.), Newsol Delax (registered trade mark, made by Nippon Oil Co., Ltd.) and the like; esters such as methyl acetate, ethyl acetate, n-butyl acetate, isobutyl acetate and the like; ethers such as ethyl ether, tetrahydrofuran, dioxane, diglyme and the like; ketones such as acetone, methyl ethyl ketone, methyl isobutyl ketone, methyl amyl ketone, cyclohexanone, isophorone and the like; cellosolves and their esters such as ethylene glycol monomethyl ether, ethylene glycol monethyl ether, ethylene glycol monobutyl ether, propylene glycol monomethyl ether, propylene glycol monoethyl ether, propylene glycol monobutyl ether and the like; chlorinated hydrocarbons such as methylene chloride, trichloroethylene, perchloroethylene, orthodichlorobenzene and the like; dimethylformamide, dimethylsulfoxide and so on. These solvents may be used alone or in admixture.

Moreover, the above reaction may be carried out in the presence or absence of a catalyst. As the catalyst, use amy be made of a well-known catalyst selected from tertiary amines such as triethylamine, dimethyl benzylamine and the like; quaternary amine salts such as tetramethyl ammonium chloride and the like; organic metal salts such as tetrabutoxy titanate, dibutyl tin dilaurate and the like; phosphorus compounds such as triphenyl phosphine and the like; organic carboxylic acid salts such as potassium benzoate, sodium benzoate and the like; inorganic salts such as potassium iodide and the like.

Similarly, a polyester compound having a given molecular weight and one hydroxyl group in its terminal is obtained by using at least one monovalent alcohol represented by the formula of $R_{11}$—OH ($R_{11}$ is a saturated aliphatic, alicyclic or aromatic group having a carbon number of 1-18) as an initiator and then subjecting at least one acid anhydride of the formula (16), at least one monoepoxy compound of the formula (15) and further at least one lactone of the formula (17) to a ring-opening addition reaction in the same manner as described above. As the monovalent alcohol, use may be made of saturated aliphatic alcohols such as methyl alcohol, ethyl alcohol, n-propyl alcohol, isopropyl alcohol, n-butyl alcohol, isobutyl alcohol, t-butyl alcohol, amyl alcohol, n-hexyl alcohol, n-heptyl alcohol, lauryl alcohol, stearyl alcohol and the like; alicyclic alcohols such as cyclopentanol, cyclohexanol and the like; and aromatic alcohols such as benzyl alcohol, p-tert-butyl benzyl alcohol and the like.

Even in the latter case, there may be used a method wherein the monoepoxy compound and the acid anhydride are ring-opening polymerized with the monovalent alcohol as an initiator and then subjected to ring-opening addition reaction with the lactone to form a polymer of block structure, and a method wherein the monoepoxy compound, acid anhydride and lactone are randomly reacted with the monovalent alcohol as an initiator to form a polymer of random structure. Moreover, the same solvent and catalyst as described above may be used in this reaction.

Furthermore, a polyester polyether compound having a given molecular weight and one hydroxyl group in its terminal is obtained by subjecting at least one lactone of the formula (17) and at least one monoepoxy compound of the formula (15) to a ring-opening addition reaction with the above monovalent alcohol as an initiator.

Even in this case, there may be used a method wherein the lactone is ring-opening polymerized with the monovalent alcohol as an initiator and then subjected to ring-opening addition reaction with the monoepoxy compound to form a polymer of block structure, a method wherein the monoepoxy compound is ring-opening polymerized with the monovalent alcohol as an initiator and then subjected to ring-opening addition reaction with the lactone to form a polymer of block structure, and a method wherein the monoepoxy compound and lactone are randomly reacted with the monovalent alcohol as an initiator to form a polymer of random structure. Moreover, the same solvent as described above may be used in this reaction.

As the ring-opening addition reaction for the production of the polyester polyether compound, there are anion polymerization, coordinate anion polymerization cation polymerization and the like as mentioned below.

The anion polymerization is carried out at 10°-200° C. in the presence of a well-known catalyst selected from alkali metals such as Li, Na, K and the like; metal alcolates such as NaOR', LiOR' and the like and tertiary amines for 1-15 hours.

The coordinate anion polymerization is carried out at 10°-200° C. in the presence of a well-known catalyst such as Al(R)3, Zn(R)2, (R)2Al(OR'), Al(OR')3, Ti-(OR')4 or the like for 1-15 hours.

Moreover, R' is a hydrogen atom or an alkyl group having a carbon number of 1-18 and R is a halogen atom or an alkyl group having a carbon number of 1-18.

The cation polymerization is carried out at 10°-200° C. in the presence of a well-known catalyst selected from metal halides such as AlCl3 and the like and acids such as p-toluene sulfonic acid, phosphoric acid and the like for 1-15 hours.

Then, at least one polyester or polyester polyether compound obtained by anyone of the above methods is reacted with at least one diisocyanate compound of the formula OCN—W—NCO (W is a residue of diisocyanate compound) at a mol ratio of the polyester compound to diisocyanate compound of 0.7-1.3, preferably 0.9-1.1 and at 0° C.-80° C. for 0.5-6 hours to obtain a polyester and/or polyester polyether compound having one isocyanate group in its terminal.

As the diisocyanate compound, mention may be made of tolylene diisocyanate, isophorone diisocyanate, 4,4'-diphenylmethane diisocyanate, hexamethylene diisocyanate, lysine diisocyanate, methylcyclohexane-2,4 (2,6) diisocyanate, 4,4'-methylenebis(cyclohexylisocyanate), 1,3-(isocyanatemethyl)cyclohexane, trimethylhexamethylene diisocyanate, diisocyanate of dimer acid and the like.

Further, the polyester and/or polyester polyether compound obtained by the above method is reacted with at least one hydroxyl group containing copolymerizable monomer and/or at least one active methylene group containing copolymerizable monomer at a mol ratio of the compound to the copolymerizable monomer of 0.7-1.5, preferably 0.8-1.2 and at 0° C.-140° C. for 1-10 hours to obtain a macromer having vinyl group or isopropenyl group in its terminal. The formation of the macromer may be carried out in the absence or presence of a well-known catalyst selected from tertiary amines such as triethylamine, dimethyl benzylamine and the like and organic metal salts such as dibutyl tin dilaurate, zinc naphthenate, zinc octylate and the like.

As the hydroxyl group containing copolymerizable monomer, mention may be made of 2-hydroxyethyl acrylate, 2-hydroxyethyl methacrylate, hydroxypropyl acrylate, hydroxypropyl methacrylate, N-methylol acrylamide, N-methylol methacrylamide, allyl alcohol, ε-caprolactone-modified hydroxyalkyl (metha)acrylate (e.g. Placcel FM-2, FM-4, trade name, made by Daicel Chemical Industries) and the like. As the active methylene group containing copolymerizable monomer, mention may be made of acetoacetoxyethyl acrylate, acetoacetoxyethyl methacrylate, acetoacetoxypropyl acrylate, acetoacetoxypropyl methacrylate, allyl acetoacetate and the like.

On the other hand, the polyester and/or polyester polyether compound having one hydroxyl group in its terminal is subjected to a ring-opening addition reaction with the acid anhydride of the formula (16) at 100° C.-200° C., preferably 120°-160° C. to form a polyester and/or polyester polyether compound having one carboxyl group in its terminal. Then this polymer compound is reacted with glycidyl group containing copolymerizable monomer such as glycidyl (metha)acrylate, allylglycidyl ether or the like at a mol ratio of 0.7-1.5, preferably 0.9-1.1 and at 100° C.-200° C., preferably 120°-160° C. for 2-20 hours to obtain a macromer having vinyl group or isopropenyl group in its terminal. In the formation of the macromer, it is desirable to add a polymerization inhibitor such as hydroquinone, 4-methoxy phenol or the like.

The thus obtained macromer of the polyester and/or polyester polyether compound represented by the following formula (18):

is copolymerized with at least one of a tertiary amino group containing copolymerizable monomer and/or a copolymerizable monomer having a nitrogen-containing heterocyclic ring with a basicity represented by the following formula (19):

and, if necessary, at least one copolymerizable monomer represented by the following formula (20):

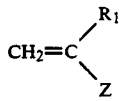

$$CH_2=C\diagup_{Z}^{R_1} \quad (20)$$

in the presence of a polymerization initiator at 40° C.-180° C. in the aforementioned solvent for 3-20 hours, whereby the first pigment dispersing agent can be produced.

As the copolymerizable monomer of the formula (19), mention may be made of aminoalkyl (metha)acrylates such as N,N-dimethylaminoethyl (metha)acrylate, N,N-diethylaminoethyl (metha)acrylate, N,N-dimethylaminopropyl (metha)acrylate, N,N-diethylaminopropyl (metha)acrylate, N,N-dimethylaminobutyl (metha)acrylate, N,N-diethylaminobutyl (metha)acrylate, N,N-dimethylaminohexyl (metha)acrylate, N,N-diethylaminohexyl (metha)acrylate and the like; aminoalkyl (metha)acrylamides such as N,N-dimethylaminoethyl (metha)acrylamide, N,N-diethylaminoethyl (metha)acrylamide, N,N-dimethylaminopropyl (metha)acrylamide, N,N-diethylaminopropyl (metha)acrylamide, N,N-dimethylaminobutyl (metha)acrylamide, N,N-diethylaminobutyl (metha)acrylamide and the like; aminoalkyl vinyl ethers N,N-dimethylaminoethyl vinyl ether, N,N-diethylaminoethyl vinyl ether, N,N-dipropylaminoethyl vinyl ether, N,N-dibutylaminoethyl vinyl ether, N,N-dimethylaminopropyl vinyl ether, N,N-diethylaminopropyl vinyl ether, N,N-dipropylaminopropyl vinyl ether, N,N-dimethylaminobutyl vinyl ether, N,N-diethylaminobutyl vinyl ether, N,N-dipropylaminobutyl vinyl ether, N,N-dibutylaminobutyl vinyl ether, N,N-dimethylaminopentyl vinyl ether, N,N-diethylaminopentyl vinyl ether, N,N-dipropylaminopentyl vinyl ether, N,N-dimethylaminohexyl vinyl ether, N,N-diethylaminohexyl vinyl ether, N,N-dipropylaminohexyl vinyl ether, N,N-dibutylaminohexyl vinyl ether, N,N-dimethylaminooctyl vinyl ether, N,N-diethylaminooctyl vinyl ether and the like; vinyl pyridines such as 2-vinyl pyridine, 4-vinyl pyridine, 5-ethyl-2-vinyl pyridine and the like; vinyl imidazoles such as 1-vinyl imidazole, 1-vinyl-2-methyl imidazole and the like; vinyl quinolines such as 2-vinyl quinoline and the like; and vinyl piperidines such as N-methyl-3-vinyl piperidine and the like.

As the copolymerizable monomer of the formula (20), mention may be made of alkyl esters of (metha)acrylic acid such as methyl (metha)acrylate, ethyl (metha)acrylate, propyl (metha)acrylate, butyl (metha)acrylate, hexyl (metha)acrylate, octyl (metha)acrylate, lauryl (metha)acrylate, stearyl (metha)acrylate, cyclohexyl (metha)acrylate, benzyl (metha)acrylate and the like; alkoxyalkyl esters such as methoxyethyl (metha)acrylate, methoxybutyl (metha)acrylate, ethoxyethyl (metha)acrylate, ethoxybutyl (metha)acrylate and the like; (metha)acrylamides such as (metha)acrylamide, N-methyl (metha)acrylamide, N-ethyl (metha)acrylamide, N-butyl (metha)acrylamide, N,N-dimethyl (metha)acrylamide, N,N-diethyl (metha)acrylamide, N,N-dipropyl (metha)acrylamide, N-methylol (metha)acrylamide, N-ethoxymethyl (metha)acrylamide, N-butoxymethyl (metha)acrylamide, N,N-dimethylaminopropyl acrylamide and the like; hydroxy (metha)acrylates such as and the like; hydroxy (metha)acrylates such as 2-hydroxyethyl (metha)acrylate, hydroxypropyl (metha)acrylate, Placcel FM-2, Placcel FM-4 and the like; vinyl aromatics such as styrene, α-methylstyrene, vinyl toluene and the like; α,β-ethylenically unsaturated carboxylic acids such as acrylic acid, methacrylic acid and the like; alkylvinyl ethers such as methylvinyl ether, ethylvinyl ether, butylvinyl ether, isobutylvinyl ether, cyclohexylvinyl ether, tertbutylcyclohexylvinyl ether, 2-chloroethylvinyl ether, n-propylvinyl ether, 1-propylvinyl ether, n-butylvinyl ether, 1-butylvinyl ether, tert-butylvinyl ether, n-pentylvinyl ether n-hexylvinyl ether, n-octylvinyl ether, 2-ethylhexylvinyl ether and the like; alicyclic vinyl ethers such as cyclopentyl vinyl ether, cyclohexyl vinyl ether, methylcyclohexyl vinyl ether and the like; aromatic vinyl ethers such as benzyl vinyl ether and the like; hydroxyalkyl vinyl ethers such as hydroxyethyl vinyl ether, hydroxypropyl vinyl ether, hydroxyisopropyl vinyl ether, hydroxybutyl vinyl ether, hydroxyhexyl vinyl ether, hydroxyoctyl vinyl ether, 2-hydroxyethyl vinyl ether, 3-hydroxypropyl vinyl ether, 2-hydroxypropyl vinyl ether and the like; vinyl acetate, vinyl chloride, acrylonitrile, allyl ethers and the like.

As the polymerization initiator use may be made of all compounds usually used in the vinyl type polymerization, which includes, for example, azobisisobutyronitrile, 2,2,-azobis-2,4-dimethylvaleronitrile, 1,1'-azobiscyclohexane-1-carbonitrile, di-t-butyl peroxide, t-butylperoxy benzoate, t-butyl peroctoate, cumene hydroperoxide, lauroyl peroxide, acetyl peroxide, methyl ethyl ketone peroxide, dicumyl peroxide and the like.

As the copolymerization method, the well-known methods such as solution polymerization, bulk polymerization, suspension polymerization and the like may be applied, and among them the solution polymerization method is desirable.

As the second production method, the tertiary amino group containing copolymerizable monomer and/or copolymerizable monomer having a nitrogen-containing heterocyclic ring with a basicity represented by the formula (19), at least one of the above hydroxyl group containing copolymerizable monomer and active methylene group containing copolymerizable monomer and, if necessary, the copolymerizable monomer of the formula (20) are previously copolymerized in the presence of the polymerization initiator at 40°-180° C. in the solvent for 3-10 hours to obtain an acryl polymer. Then, the acryl polymer is reacted with the polyester and/or polyester polyether compound having one isocyanate group in its terminal obtained by the first production method at 30°-100° C. for 3-20 hours, whereby the first pigment dispersing agent ca be produced.

As a production method of the pigment dispersing agent represented by the general formula (II), at least one hydroxyl group containing copolymerizable monomer or carboxyl group containing copolymerizable monomer such as (metha)acrylic acid or the like is used as an initiator and then at least one monoepoxy compound of the formula (15), at least one acid anhydride of the formula (16) and at least one lactone of the formula (17) are subjected to a ring-opening addition reaction according to the first production method in the presence of the polymerization inhibitor to obtain a macromer having a given molecular weight and containing hydroxyl group in one terminal and vinyl group or isopropenyl group in the other terminal. In this case, there may be used a method wherein the hydroxyl group containing copolymerizable monomer or carboxyl group containing copolymerizable monomer is first used as an initiator and then the monoepoxy compound and acid anhydride are ring-opening copolymerized and subjected to a ring-opening addition reaction with the lactone to form a polymer of block structure, a method wherein the hydroxyl group containing copolymerizable monomer is used as an initiator and then the lactone is subjected to a ring-opening addition reaction and ring-opening copolymerized with the epoxy compound and acid anhydride to form a polymer of block structure, a method wherein the hydroxyl group containing copolymerizable monomer or carboxyl group containing copolymerizable monomer is first used as an initiator and then the monoepoxy compound, acid anhydride and lactone are randomly addition reacted to from a polymer of random structure. On the other hand, at least one lactone of the formula (17) and at least one monoepoxy compound of the formula (15) are subjected to a ring-opening addition reaction with the hydroxyl group containing copolymerizable monomer as an initiator in the presence of the polymerization inhibitor according to the above first production method to obtain a macromer of polyester polyether compound having a given molecular weight and containing hydroxyl group in one terminal and vinyl group or isopropenyl group in the other terminal. In this case, there may be used a method wherein the hydroxyl group containing copolymerizable monomer is first used as an initiator and then the lactone is subjected to a ring-opening addition reaction and ring-opening copolymerized with the monoepoxy compound to form a polymer of block structure, a method wherein the hydroxyl group containing copolymerizable monomer is used as an initiator and then the monoepoxy compound is ring-opening copolymerized and subjected to a ring-opening addition reaction with the lactone to form a polymer of block structure, a method wherein the hydroxyl group containing copolymerizable monomer is first used as an initiator and then the monoepoxy compound and lactone are randomly addition reacted to from a polymer of random structure.

Then, the thus obtained macromer of polyester or polyester polyether compound represented by the following formula (21):

is copolymerized with at least one copolymerizable monomer selected from the tertiary amino group containing copolymerizable monomer and copolymerizable monomer having a nitrogen-containing heterocyclic ring with a basicity represented by the formula (19) and, if necessary, at least one copolymerizable monomer represented by the formula (20) in the presence of the polymerization initiator at 40°-180° C. for 3-20 hours, whereby the first pigment dispersing agent can be produced.

The second dispersing agent according to the invention can be produced according to the second method for the production of the first pigment dispersing agent of the formula (I).

The third dispersing agent according to the invention can be produced according to the first method for the production of the first pigment dispersing agent of the formula (I).

The pigment dispersing agents according to the invention are used for paints, inks, toners and magnetic tape coating materials as well as various colorants. As a dispersing resin to be applied, use may be made of alkid resin, oil-free polyester resin, acrylic resin, epoxy resin, polyurethane resin, silicone resin, fluorine resin, melamine resin, benzoguanamine resin, urea resin and the like. Further, as an objective pigment, mention may be made of inorganic pigments such as titanium dioxide, zinc oxide, cadmium sulfide, iron oxide, calcium carbonate, red lead, zinc sulfide, barium sulfate, barium carbonate, clay, talc, chrome yellow, carbon black and the like; organic pigments such as azo series, diazo series, condensed diazo series, thioindigo series, indanthrone series, anthraquinone series, benzimidazolone series, phthalocyanine series, pyranthrone series, anthrapyridine series, isoindolinone series, perylene series, quiacridone series, furavanthrone series, dioxazine series, piranthrone series, perinone series and so on. The pigment dispersing agents according to the invention exhibit an effect of improving the pigment dispersibility against these pigments.

The pigment dispersing agent according to the invention is used in an amount as a solid content of 1-200% by weight, preferably 5-100% by weight to the pigment in a so-called pigment dispersion base composition. The pigment dispersion base composition is comprised of the pigment dispersing agent according to the invention, the pigment and the organic solvent, or may further contain a part or whole of a film-forming resin.

The pigment dispersion base composition is dispersed by means of dispersing machine usually used in the art, such as roll mill, ball mill, sand grind mill, attritor, paint shaker, kneader, high speed dispersing machine, ultrasonic dispersing machine, dissolver or the like, which is supplied for use in colorants.

The paints obtained by using the pigment dispersing agent according to the invention are excellent in the dispersibility of pigment and color strength and form a paint film having good gloss, distinctness of image and smoothness. Furthermore, the pigment dispersing agent according to the invention strongly adsorbs onto the surface of the pigment to prevent a tendency of agglomerating the pigment particles, resulting in the production of the pigment dispersion base composition having an excellent storage stability and a high pigment content, and consequently paints having a high solid content can be produced.

In the pigment dispersing agent according to the invention, since the ring-opening reaction product of monocarboxylic acid, monoepoxy compound, acid anhydride and lactone, the ring-opening reaction product of monovalent alcohol, acid anhydride, monoepoxy compound and lactone, or the ring-opening reaction product of monovalent alcohol, lactone and monoepoxy compound is a polymer component, the polarity can optionally be adjusted by changing the monomer composition, so that the pigment dispersing agent according to the invention is applicable to both acrylic resin series paint and polyester series paint frequently used in the art.

Furthermore, in the pigment dispersing agent according to the invention, it is possible to introduce hydroxyl group into the structure as a crosslinking point, so that the pigment dispersing agent can chemically be fixed in the paint film by the curing reaction with a crosslinking agent likewise the case of the film-forming resin. As a result, the boundary face between the pigment and the resin is chemically strengthen, so that there is no damage on the water resistance, humidity resistance, weather resistance and the like of the paint film.

In addition, since all amino groups in the pigment dispersing agent are tertiary amino group, even when the pigment dispersing agent is applied to thermosetting paints, no yellowing occurs, so that it is useful in the colorant field.

The following examples are given in illustration of the invention and are not intended as limitations thereof. In these examples, "part" and "%" are by weight.

REFERENCE SYNTHESIS EXAMPLES 1, 2

Production of Polyester Resin

A polyester resin as a main film-forming component for polyester resin series paints was produced as follows.

Into a reaction vessel provided with a reflux condenser, an inlet tube for nitrogen gas, a thermometer and a stirring blade were charged starting materials having a composition shown in Table 1 (Reference Synthesis Examples 1, 2), which were heated to an upper limit temperature of 230° C. under a stream of nitrogen gas with stirring. Water generated in the progress of the reaction was removed together with xylene through azeotropic distillation and the heating was further continued till the acid value was about 10 to complete the reaction. The resulting resin was diluted with xylene so as to render the nonvolatile content into 60%, whereby the objective polyester resins PE-1 and PE-2 were obtained.

TABLE 1

|  | Reference Synthesis Example | |
|---|---|---|
|  | 1 | 2 |
| Polyester resin No. | PE-1 | PE-2 |
| lauric acid | 4.5 | — |
| tall oil fatty acid | — | 16.2 |
| caster oil | — | 3.8 |
| phthalic anhydride | 5.8 | 17.7 |
| isophthalic acid | 21.8 | — |
| adipic acid | 1.6 | 5.0 |
| neopentyl glycol | 12.8 | 10.4 |
| trimethylol propane | 7.4 | — |
| pentaerythritol | — | 8.6 |
| Cardula E-10 [1] | 8.3 | — |
| xylene | 1.8 | — |
| xylene (diluting solvent) | 36.0 | 38.3 |
| nonvolatile content (%) [2] | 60 | 60 |
| resin acid value | 10 | 10 |

[1] Cardula E-10: trade name, made by Shell Chemical Co., Ltd. (glycidylester of versatic acid)
[2] according to JIS K 5400 (1979) 8.2

REFERENCE SYNTHESIS EXAMPLES 3, 4

Preduction of Acrylic Resin

An acrylic resin as a main film-forming component for acrylic resin series paints were produced as follows.

Into a reaction vessel provided with a reflux condenser, an inlet tube for nitrogen gas, a thermometer, a stirring blade and a monomer dropping device was charged a solvent shown in Table 2 and then the temperature was raised to a reflux temperature under a stream of nitrogen gas. A mixture of monomers and t-butylperoxy benzoate as a polymerization inhibitor as shown in Table 2 was added dropwise through the dropping device over 2 hours under reflux state. After the completion of the addition, the stirring was further continued for 5 hours under reflux state to complete the polymerization, whereby the objective varnishes AC-1, AC-2 were obtained.

TABLE 2

| Reference Synthesis Example | | 3 | 4 |
|---|---|---|---|
| Acrylic resin No. | | AC-1 | AC-2 |
| solvent | xylene | 40 | 40 |
| Monomer composition | methyl methacrylate | 23.4 | 20.4 |
|  | butyl acrylate | 13.3 | 6.4 |
|  | styrene | 10.0 | 4.0 |
|  | 2-hydroxyethyl methacrylate | 12.0 | 3.0 |
|  | acrylic acid | 0.7 | 0.7 |
|  | Placcel FM-2 [1] | — | 25.0 |
|  | t-butylperoxy benzoate | 0.6 | 0.5 |
| Properties | nonvolatile content (%) | 60.0 | 60.0 |
|  | weight average molecular weight | 21000 | 28000 |
|  | hydroxyl value | 86 | 87 |

[1] Placcel FM-2: trade name, made by Daicel Chemical Industries (lactone-modified methacrylate monomer)

SYNTHESIS EXAMPLES 1, 2

A macromer for the pigment dispersing agent was produced as follows.

Into a reaction vessel provided with a reflux condenser, an inlet for nitrogen gas, a dropping funnel, a thermometer and a stirring blade were charged a solvent and sodium methylate and decanol as (Y+A) components shown in Table 3 and then the temperature was raised to 130°–140° C. under a stream of nitrogen gas. Further, ε-caprolactone shown in table 3 was added dropwise through the dropping funnel over 1 hour under reflux state. After the stirring was further continued for 4 hours under reflux state and dried by heating at 140° C. for 30 minutes, it was confirmed that the nonvolatile content arrived at the given value, and then butylglycidyl ether shown in Table 3 was added dropwise through the dropping funnel over 1 hour. After the stirring was further continued for 4 hours under reflux state and dried by heating at 140° C. for 30 minutes, it was confirmed that the nonvolatile content arrived at the given value. Next, the resulting varnish was cooled to a temperature of 30° C. and added with tolylene diisocyanate shown in Table 3, which was stirred at 30° C. for 1 hour, and after it was confirmed that 50% of isocyanate group was reacted (a case that 2 mol of isocyanate group in tolylene diisocyante was reacted was 100%), 2-hydroxyethyl methacrylate shown in Table 3 was added. After the addition, the temperature was raised to 60° C., and the reaction was continued at this temperature for 3 hours, and the reaction was stopped after it was confirmed that 100% of isocyanate group was reacted. Thus, the macromers A-1, A-2 were produced.

SYNTHESIS EXAMPLES 3, 4, 7–20

In the same vessel as in Synthesis Example 1 were charged solvent, and decanol, phthalic anhydride and dimethyl benzylamine as (Y+A) components as shown in Tables 3 and 4 and then the temperature was raised to 130°–140° C. under a stream of nitrogen gas. Thereafter, butylglycidyl ether or phenylglycidyl ether shown in Table 3 was added dropwise through the dropping funnel over 1 hour under reflux state. After the reaction was continued for 5 hours under reflux state, it was confirmed that the acid value of the resin arrived at not more than 1, and then dibutyl tin dilaurate was added and further ε-caprolactone was added dropwise through the dropping funnel over 1 hour. After the reaction was continued for 5 hours under reflux state and the drying was carried out by heating at 140° C. for 30 minutes, it was confirmed that the nonvolatile content arrived at the given value. Then, the resulting varnish was cooled to a temperature of 30° C. and added with tolylene diisocyanate as shown in Tables 3, 4, which was stirred at 30° C. for 1 hour. After it was confirmed that 50% of isocyanate group was reacted, 2-hydroxyethyl methacrylate or acetoacetoxyethyl methacrylate shown in Table 3 was added. After the addition, the temperature was raised to 60° C. and the reaction was further continued at this temperature for 4 hours, it was confirmed that 100% of isocyanate group was reacted. Thus, the macromers A-3, A-4, and A-7 to A-20 were produced.

SYNTHESIS EXAMPLES 5, 6

Into the same vessel as in Synthesis Example 1 were charged solvent, and decanol, phthalic anhydride and dibutyl tin dilaurate as (Y+A) components as shown in Table 3, which was raised to a reflux temperature of 130°–140° C. Then, Cardula E-10 shown in Table 3 was added dropwise through the dropping funnel over 1 hour. After the reaction was continued for 5 hours under reflux state and it was confirmed that the acid value of the resin arrived at not more than 1, the reaction product was cooled to 30° C. Then, tolylene diisocyanate shown in Table 3 was added and stirred at 30° C. for 1 hour, and after it was confirmed that 50% of isocyanate group was reacted, 2-hydroxyethyl methacrylate shown in Table 3 was added. After the addition, the temperature was raised to 60° C. and the reaction was further continued at this temperature for 4 hours and completed by confirming that 100% of isocyanate group was reacted. Thus, the macromers A-5, A-6 were produced.

SYNTHESIS EXAMPLE 21

Into the same vessel as in Synthesis Example 1 were charged solvent, and decanol, phthalic anhydride and tetramethyl ammonium chloride as (Y+A) components as shown in Table 5, which was raised to a reflux temperature of 130°–140° C. Then, butylglycidyl ether shown in Table 5 was added dropwise through the dropping funnel over 1 hour. After the reaction was continued for 5 hours under reflux state and it was confirmed that the acid value of the resin arrived at not more than 1, dibutyl tin dilaurate shown in table 5 was added and further ε-caprolactone was added dropwise through the dropping funnel over 1 hour. Further, the reaction was continued for 5 hours under reflux state and it was confirmed that after the drying was carried out by heating at 140° C. for 30 minutes, the nonvolatile content arrived at the given value. Next, phthalic anhydride shown in Table 5 was added and the reaction was continued for 3 hours under reflux state. After it was confirmed that the acid value arrived at the given value, 4-methoxy phenol and glycidyl methacrylate were added and the reaction was continued for 10 hours under reflux state. After it was confirmed that the acid value arrived at not more than 2, the reaction product was cooled to room temperature. Thus, the macromer A-21 was produced.

SYNTHESIS EXAMPLE 22

Into the same vessel as in Synthesis Example 1 were charged solvent, and acrylic acid, Cardula E-10, phthalic anhydride, tetramethyl ammonium chloride and 4-merthoxy phenol as (B+Q) components as shown in Table 5, which was raised to a reflux temperature of 130°–140° C. After the reaction was continued for 3 hours under reflux state and it was confirmed that the acid value of the resin arrived at not more than 1, dibutyl tin dilaurate was added and further ε-caprolactone was added dropwise through the dropping funnel over 1 hour and then the reaction was continued for 5 hours under reflux state. After the drying was carried out by heating at 140° C. for 30 minutes, it was confirmed that the nonvolatile content arrived at the given value.

Thereafter, the resulting varnish was cooled to room temperature. Thus, the macromer A-22 was produced.

SYNTHESIS EXAMPLE 23

The same procedure as in Synthesis Example 22 was repeated except that 2-hydroxyethyl methacrylate was used instead of acrylic acid in table 5, whereby the macromer A-23 was produced.

SYNTHESIS EXAMPLES 24–28

An acrylic copolymer as a component S for the pigment dispersing agent was produced as follows.

Into a reaction vessel provided with a reflux condenser, an inlet tube for nitrogen gas, a dropping funnel, a thermometer and a stirring blade was charged a solvent among a composition shown in Table 6, which was raised to a temperature of 120° C. under a stream of nitrogen gas. A mixture of monomers and polymerization initiator shown in Table 6 was added dropwise through the dropping funnel over 2 hours under reflux state and the stirring was further continued for 5 hours to complete the polymerization, whereby the acrylic copolymers S-1 to S-5 were produced as a component S.

SYNTHESIS EXAMPLE 29

A polymer compound as a component T for the pigment dispersing agent was produced as follows.

Into the same vessel as in Synthesis Example 1 were charged solvent, sodium methylate and decanol as shown in Table 7, which was raised to a temperature of 130°–140° C. under a stream of nitrogen gas. A mixture of ε-caprolactone and butylglycidyl ether shown in Table 7 was added dropwise through the dropping funnel over 2 hours and the stirring was further continued over 10 hours under reflux state. After the cooling to 30° C., tolylene diisocyanate was added and the stirring was continued at 30° C. for 2 hours to produce the polymer compound T-1 as a component T.

SYNTHESIS EXAMPLES 30–34

The same procedure as in Synthesis Example 29 was repeated according to the composition as shown in Table 7 to obtain the polymer compounds T-2 to T-6 as a component T.

COMPARATIVE SYNTHESIS EXAMPLE 1

Into the same vessel as in Synthesis Example 1 were charged solvent, and butanol and dibutyl tin dilaurate as (Y+A) components as shown in Table 8, which was raised to a reflux temperature. Then, ε-caprolactone shown in Table 8 was added dropwise through the dropping funnel over 1 hour. The reaction was further continued for 4 hours under reflux state. Thereafter, the reaction product was cooled to 20° C. and added with tolylene diisocyanate shown in Table 8. The stirring was continued at 20° C. for 2 hours and 2-hydroxyethyl methacrylate shown in Table 8 was added after it was confirmed that 50% of isocyanate group was reacted. After the addition, the temperature was raised to 50° C., and the reaction was continued at this temperature for 5 hours. After it was confirmed that 100% of isocyanate group was reacted, the reaction was stopped to obtain a macromer A-24.

COMPARATIVE SYNTHESIS EXAMPLE 2

A macromer A-25 was obtained according to a compounding recipe shown in Table 8 in the same manner as described in Synthesis Example 5.

COMPARATIVE SYNTHESIS EXAMPLES 3, 4

Macromers A-26, A-27 were obtained according to a compounding recipe shown in Table 9 in the same manner as described in Synthesis Example 21.

EXAMPLES 1-24

Into the same reaction vessel as used in Synthesis Example 1 was charged a greater part of a solvent as shown in Tables 10 and 11, and then the temperature was raised to 85° C. Next, a monomer mixture of (Y+A) components and component X and 20% of an initiator solution as shown in Tables 10 and 11 were added dropwise through separate dropping funnels over 2 hours. Furthermore, the reaction was continued at 85° C. for 2 hours to obtain objective pigment dispersing agents 1-24.

EXAMPLES 25-29

Into the same reaction vessel as used in Synthesis Example 1 was charged a greater part of a solvent as shown in Table 11, and then the temperature was raised to 85° C. Next, a monomer mixture of (Y+A) components, component X and component Z and 20% of an initiator solution as shown in Table 11 were added dropwise through separate dropping funnels over 2 hours. Furthermore, the reaction was continued at 85° C. for hours to obtain objective pigment dispersing agents 5-29.

EXAMPLES 30-34

Pigment dispersing agents 30-34 were produced according to a compounding recipe as shown in Table 12 in the same manner as in Example 25.

EXAMPLE 35-42

A pigment dispersing agent was produced according to a composition ratio as shown in Table 13 as follows.

Into the same vessel as in Synthesis Example 1 were charged component S and solvent as shown in Table 13, to which was added component T with stirring. Thereafter, the reaction mass was heated to a temperature shown in the column "reaction conditions" of Table 13 and reacted at this temperature for a time as shown in the column of "reaction conditions" to obtain
objective pigment dispersing agents 35-42.

COMPARATIVE EXAMPLES 1-5

Pigment dispersing agents 43-47 were produced according to a compounding recipe shown in Table 14 in the same manner as in Example 1.

COMPARATIVE EXAMPLE 6

Into the same vessel as in Synthesis Example 1 was charged a pleater part of a solvent as shown in Table 14 and then the temperature was raised to 50° C. Next, a monomer mixture of (Y+A) components and component X and a solution of 10% initiator in xylene as shown in Table 14 were added dropwise through separate dropping funnels over 3 hours. The reaction was further continued at 50° C. for 4 hours to produce a pigment dispersing agent 48.

COMPARATIVE EXAMPLES 7-10

Pigment dispersing agents 49-52 were produced according to a compounding recipe as shown in Table 15 in the same manner as in Example 30.

COMPARATIVE EXAMPLE 11

A pigment dispersing agent 53 was produced according to a compounding recipe as shown in Table 13 in the same manner as in Example 35.

APPLICATION EXAMPLES 1-48

Dispersion pastes and paints each having a composition as shown in Tables 16-19 were prepared by using the pigment dispersing agents shown in Tables 10-13, and then the properties of the paste and the film performances of the paint were measured to evaluate the effect of the pigment dispersing agent according to the invention.

That is, the starting materials were uniformly mixed in accordance with a formulation of dispersion paste shown in Tables 16-19 and a pigment was dispersed thereinto by means of a paint shaker (made by Red Devil Co.) to obtain a dispersion paste. The viscosity and storage stability of the dispersion paste are shown in the column "paste properties" of Tables 16-19.

Then, the starting materials using the above dispersion paste were mixed in accordance with a formulation for paint shown in Tables 16-19 and thoroughly stirred to prepare a paint. To this paint was added a thinner of dilution (a mixed solvent of cellosolve acetate/xylene=50/50) so as to adjust a viscosity to 22 seconds (25° C.) through Ford Cup No. 4, whereby a finishing paint for spray coating was obtained.

Next, a primer coated plate was provided in order to evaluate the film performances of this paint.

That is, an SPCC dull steel sheet (size: 0.8×100×150 mm) subjected to a zinc phosphate treatment was subjected to na electrodeposition with a general-purpose black cation electropaint (AQUA Black No. 4200, trade name, made by Nippon Oil and Fats Co., Ltd.) and then baked at 170° C. for 30 minutes to obtain a dried paint film of 20 μm in thickness. Thereafter, an alkyd/melamine series gray intermediate paint for automobile (EPICO No. 1500 sealer, trade name, made by Nippon Oil and Fats Co., Ltd.) was diluted with a thinner (Thinner TR101, trade name, made by Nippon Oil and Fats Co., Ltd.) so as to adjust a viscosity to 30 seconds (25° C.) through Ford Cup No. 4, which was sprayed onto the above primer coated sheet and baked at 140° C. for 30 minutes to obtain a dried paint film of 40 μm in thickness. Then, the aforementioned finishing paint was sprayed onto the thus painted steel sheet and baked at 140° C. for 30 minutes to obtain a test film (finished film thickness: 40 μm). The specular gloss at 30° (Drigon goniophotometer, made by Hunter Laboratories), humidity resistance, weather resistance, adhesion property and the like were evaluated with respect to the thus obtained test specimen. The results are also shown in Tables 16-19.

APPLICATION COMPARATIVE EXAMPLES 1-12

Dispersion pastes and paints each having a composition as shown in Table 20 were prepared by using the pigment dispersing agents shown in Tables 14 and 15 in the same manner as in Example 1, and then the properties of paste and film performances of paint were measured.

APPLICATION COMPARATIVE EXAMPLE 13

Into a reaction vessel provided with a condenser, an inlet tube for nitrogen gas, a thermometer and a stirring blade were charged 400 parts of xylene, 59.4 parts of lauric acid, 222.8 parts of Cardula E-10 (glycidyl ester of versatic acid, epoxy equivalent: 250, trade name, made by Shell Chemicals Co., Ltd.) and 87.9 parts of phthalic anhydride as disclosed in U.S. Pat. No. 4,933,417, which was raised to a temperature of 150°-160° C. and stirred in a nitrogen gas atmosphere for 5-8 hours. When the acid value of the resin arrived at not more than 2.0, the reaction mass was cooled to 20°-30° C. and added with 51.7 parts of tolylene diisocyanate and then the stirring was further continued at 40° C. for 5-8 hours. When 50% of isocyanate group was reacted, 178.2 parts of Epomin Sp-006 (trade name, made by Nippon Shokubai Kagaku Kogyo Co., Ltd.) was added and then the stirring was continued at 30° C. for 5 hours to obtain a pigment dispersing agent 54.

A dispersion paste and paint having a composition as shown in Table 20 were prepared by using the above pigment dispersing agent in the same manner as in Example 1, and then the properties of paste and film performances of paint were measured to evaluate the effect of this pigment dispersing agent.

APPLICATION COMPARATIVE EXAMPLE 14

Into the same vessel as in Synthesis Example 1 was charged 40.0 parts of xylene and then the temperature was raised to a reflux state as disclosed in EP-A-0358358. The, a monomer mixture of 14.15 parts of methyl methacrylate, 12.0 parts of ethyl acrylate, 12.0 parts of lauryl methacrylate, 9.9 parts of styrene, 8.9 parts of 2-hydroxyethyl methacrylate, 0.85 part of glycidyl methacrylate and 4.3 parts of t-butylperoxy benzoate was added dropwise through the dropping funnel over 2 hours while maintaining the reflux state. After the completion of the addition, the stirring was further continued for 2 hours under the reflux state to obtain an acrylic resin B1-2. In to the same vessel as in Synthesis Example 1 was charged 81.7 parts of the resin B1-2, to which was added a mixed solution of 0.98 part of Epomine SP-006 (trade name, Nippon Shokubai Kagaku Kogyo Co., Ltd.) and 17.32 parts of butanol with strong stirring and held at 120° C. for 2 hours to obtain a pigment dispersing agent 55.

A dispersion paste and paint having a composition as shown in Table 19 were prepared by using the above pigment dispersing agent in the same manner as in Example 1, and then the properties of paste and film performances of paint were measured to evaluate the effect of this pigment dispersing agent.

In case of using the pigment dispersing agents according to the invention, as shown in Tables 16-19, the storage stability of dispersion paste is excellent and also it has been confirmed that as to the film performances, the gloss is excellent in all paint films and the humidity resistance, weather resistance and adhesion property are not damaged. Furthermore, there is observed no yellowing of the paint film due to the pigment dispersing agent.

However, as shown in Application Comparative Examples of Table 20, in cases that the number average molecular weight of (Y+A) components is less than 500 (Application Comparative Example 1) or exceeds 20,000 (Application Comparative Examples 2, 10), and that the amine value is less than 10 (Application Comparative Examples 3, 7) or exceeds 200 (Application Comparative Examples 4, 8), and that the number average molecular weight of the pigment dispersing agent is less than 1,000 (Application Comparative Examples 5, 9) or exceeds 100,000 (Application Comparative Example 6), and that the dipsersing agent is not used (Application Comparative Example 12), the stability of the dispersion paste is bad and poorer than those of Application Examples.

In case of U.S. Pat. No. 4,933,417 and EP-A-0358358, the paint film is yellowed during the baking and is poorer than those of Application Examples.

TABLE 3(a)

| | | | Synthesis Example | | | | | | | | |
|---|---|---|---|---|---|---|---|---|---|---|---|
| | | | 1 | 2 | 3 | 4 | 5 | 6 | 7 | 8 | 9 |
| Macromer No. | | | A-1 | A-2 | A-3 | A-4 | A-5 | A-6 | A-7 | A-8 | A-9 |
| solvent | | xylene | 36.6 | 38.1 | 37.0 | 37.0 | 39.3 | 40.3 | 33.7 | 33.3 | 35.4 |
| Resin | (Y + A) | decanol | 4.3 | 2.3 | 3.0 | 3.0 | 2.6 | 1.2 | — | — | 3.0 |
| composition | components | lauric acid | — | — | — | — | — | — | 3.8 | 3.8 | — |
| | | phthalic anhydride | — | — | 8.4 | 8.4 | 8.5 | 8.5 | 8.4 | 8.4 | 8.4 |
| | | butylglycidyl ether | 15.3 | 22.1 | 8.8 | — | — | — | 11.3 | — | 8.8 |
| | | phenylglycidyl ether | — | — | — | 10.2 | — | — | — | 13.1 | — |
| | | Cardula E-10 [1)] | — | — | — | — | 16.0 | 15.9 | — | — | — |
| | | ε-caprolactone | 35.5 | 33.0 | 36.6 | 35.2 | 28.5 | 31.7 | 36.6 | 35.2 | 36.6 |
| | | sodium methylate | 0.1 | 0.1 | — | — | — | — | — | — | — |
| | | dimethyl benzylamine | — | — | 0.3 | 0.3 | — | — | 0.3 | 0.3 | 0.3 |
| | | dibutyl tin dilaurate | — | — | 0.1 | 0.1 | 0.1 | 0.1 | 0.1 | 0.1 | 0.1 |
| | | tolylene diisocyanate | 4.7 | 2.5 | 3.3 | 3.3 | 2.9 | 1.3 | 3.3 | 3.3 | 3.3 |
| | | 2-hydroxyethyl methacrylate | 3.5 | 1.9 | 2.5 | 2.5 | 2.1 | 1.0 | 2.5 | 2.5 | — |
| | | acetoacetoxyethyl methacrylate | — | — | — | — | — | — | — | — | 4.1 |
| Design value | p | | — | — | — | — | — | — | 3.0 | 3.0 | — |
| | q | | — | — | — | — | — | — | 16.9 | 16.3 | — |
| | r | | — | — | 3.0 | 3.0 | 3.5 | 7.6 | — | — | 3.0 |
| | s | | — | — | 16.9 | 16.9 | 15.2 | 37.0 | — | — | 16.9 |
| | t | | 11.5 | 19.9 | — | — | — | — | — | — | — |
| | u | | 4.3 | 11.7 | — | — | — | — | — | — | — |
| Properties | number average molecular weight | | 2300 | 4300 | 3300 | 3300 | 2600 | 4100 | 3400 | 3500 | 3350 |

TABLE 3(a)-continued

|  | Synthesis Example | | | | | | | | |
|---|---|---|---|---|---|---|---|---|---|
|  | 1 | 2 | 3 | 4 | 5 | 6 | 7 | 8 | 9 |
| nonvolatile content (%) | 63.4 | 61.9 | 62.7 | 62.7 | 60.7 | 59.7 | 66.0 | 66.4 | 64.3 |

[1] Cardula E-10: trade name, made by Shell Chemical Co., Ltd. (glycidylester of versatic acid)

TABLE 3(b)

|  |  |  | Synthesis Example | | | | | | | | |
|---|---|---|---|---|---|---|---|---|---|---|---|
|  |  |  | 10 | 11 | 12 | 13 | 14 | 15 | 16 | 17 | 18 |
| Macromer No. |  |  | A-10 | A-11 | A-12 | A-13 | A-14 | A-15 | A-16 | A-17 | A-18 |
| solvent |  | xylene | 35.4 | 37.6 | 36.1 | 36.7 | 35.0 | 37.3 | 35.8 | 36.8 | 35.0 |
| Resin | (Y + A) | decanol | 3.0 | 3.0 | 3.0 | 3.0 | 3.0 | 3.0 | 3.0 | 3.0 | 3.0 |
| composition | components | lauric acid | — | — | — | — | — | — | — | — | — |
|  |  | phthalic anhydride | 8.4 | 8.4 | 8.4 | 8.4 | 8.4 | 8.4 | 8.4 | 8.4 | 8.4 |
|  |  | butylglycidyl ether | — | 8.8 | 8.8 | 8.8 | 8.8 | 8.8 | 8.8 | 8.8 | 8.8 |
|  |  | phenylglycidyl ether | 10.2 | — | — | — | — | — | — | — | — |
|  |  | Cardula E-10 [1] | — | — | — | — | — | — | — | — | — |
|  |  | ε-caprolactone | 35.2 | 36.6 | 36.6 | 36.6 | 36.6 | 36.6 | 36.6 | 36.6 | 36.6 |
|  |  | sodium methylate | — | — | — | — | — | — | — | — | — |
|  |  | dimethyl benzylamine | 0.3 | 0.3 | 0.3 | 0.3 | 0.3 | 0.3 | 0.3 | 0.3 | 0.3 |
|  |  | dibutyl tin dilaurate | 0.1 | 0.1 | 0.1 | 0.1 | 0.1 | 0.1 | 0.1 | 0.1 | 0.1 |
|  |  | tolylene diisocyanate | 3.3 | 3.0 | 3.0 | 3.5 | 3.5 | 3.3 | 3.3 | 3.3 | 3.3 |
|  |  | 2-hydroxyethyl methacrylate | — | 2.2 | — | 2.6 | — | 2.2 | — | 2.7 | — |
|  |  | acetoacetoxyethyl methacrylate | 4.1 | — | 3.7 | — | 4.3 | — | 3.7 | — | 4.5 |
| Design | p |  | — | — | — | — | — | — | — | — | — |
| value | q |  | — | — | — | — | — | — | — | — | — |
|  | r |  | 3.0 | 3.0 | 3.0 | 3.0 | 3.0 | 3.0 | 3.0 | 3.0 | 3.0 |
|  | s |  | 16.3 | 16.9 | 16.9 | 16.9 | 16.9 | 16.9 | 16.9 | 16.9 | 16.9 |
|  | t |  | — | — | — | — | — | — | — | — | — |
|  | u |  | — | — | — | — | — | — | — | — | — |
| Properties | number average molecular weight |  | 3350 | 3300 | 3350 | 3350 | 3550 | 3550 | 3550 | 3350 | 3550 |
|  | nonvolatile content (%) |  | 63.3 | 62.1 | 63.6 | 63.0 | 64.7 | 62.4 | 63.9 | 62.9 | 64.7 |

[1] Cardula E-10: trade name, made by Shell Chemical Co., Ltd. (glycidylester of versatic acid)

TABLE 4

|  |  |  | Synthesis Example | |
|---|---|---|---|---|
|  |  |  | 19 | 20 |
| Macromer No. |  |  | A-19 | A-20 |
| solvent |  | xylene | 39.6 | 39.5 |
| Resin | (Y + A) | decanol | 10.8 | 0.6 |
| composition | components | phthalic anhydride | 10.0 | 2.6 |
|  |  | butylglycidyl ether | 10.6 | 2.8 |
|  |  | ε-caprolactone | 7.8 | 53.0 |
|  |  | dimethyl benzylamine | 0.3 | 0.3 |
|  |  | dibutyl tin dilaurate | 0.1 | 0.1 |
|  |  | tolylene diisocyanate | 11.9 | 0.6 |
|  |  | 2-hydroxyethyl methacrylate | 8.9 | 0.5 |
| Design | r |  | 1.0 | 5.0 |
| value | s |  | 1.0 | 131.6 |
| Properties | number average molecular weight |  | 900 | 17000 |
|  | nonvolatile content (%) |  | 60.1 | 60.2 |

TABLE 6

|  |  | Synthesis Example | | | | |
|---|---|---|---|---|---|---|
|  |  | 24 | 25 | 26 | 27 | 28 |
| Component S No. |  | S-1 | S-2 | S-3 | S-4 | S-5 |
| solvent | xylene | 25 | 25 | 25 | 25 | 25 |
|  | toluene | 24 | 24 | 24 | 24 | 24 |
| Monomer | dimethyl aminoethyl methacrylate | 15.0 | — | — | — | 27.3 |
| composition | dimethyl amino-propyl methacrylamide | — | 21.7 | — | — | — |
|  | dimethyl amino-propyl acrylamide | — | — | 15.0 | 24.4 | — |
|  | 2-hydroxyethyl methacrylate | 6.0 | — | 6.0 | 13.5 | — |
|  | Placcel FM-4 [1] | 28.0 | — | 28.0 | — | — |
|  | acetoacetoxyethyl methacrylate | — | 27.3 | — | 11.1 | — |
|  | methyl methacrylate | — | — | — | — | 9.0 |
|  | butyl methacrylate | — | — | — | — | 12.7 |
|  | 2,2'-azobis(2,4- | — | 2.0 | — | — | — |

TABLE 5

| Synthesis Example |  |  | 21 | Synthesis Example |  |  | 22 | 23 |
|---|---|---|---|---|---|---|---|---|
| Macromer No. |  |  | A-21 | Macromer No. |  |  | A-22 | A-23 |
| Solvent |  | xylene | 397.38 |  |  | xylene | 397.38 | 398.58 |
| Resin | (Y + A) | decanol | 40.7 | (B + Q) | | acrylic acid | 12.7 | — |
| composition | components | phthalic anhydride | 114.5 | components | | 2-hydroxyethyl | — | 22.3 |
|  |  | butylglycidyl ether | 105.6 |  |  | Cardula E-10 | 276.9 | 270.0 |
|  |  | tetramethyl ammonium chloride | 0.12 |  |  | phthalic anhydride | 130.1 | 132.0 |
|  |  | dibutyl tin dilaurate | 1.2 |  |  | tetramethyl ammonium chloride | 0.12 | 0.12 |
|  |  | ε-caprolactone | 264.5 |  |  |  |  |  |
|  |  | phthalic anhydride | 38.2 |  |  | 4-methoxy phenol | 1.2 | 1.2 |
|  |  | 4-methoxy phenol | 1.2 |  |  | dibutyl tin dilaurate | 1.2 | 1.2 |
|  |  | glycidyl methacrylate | 36.6 |  |  | ε-caprolactone | 180.4 | 175.8 |
| Properties | number average molecular weight |  | 2300 |  | number average molecular weight |  | 3300 | 3400 |
|  | nonvolatile content (%) |  | 60 |  | nonvolatile content (%) |  | 60 | 60 |
| Design value | r + s |  | 12 |  | r + s |  | 15 | 15 |

TABLE 6-continued

|  |  | Synthesis Example | | | | |
|---|---|---|---|---|---|---|
|  |  | 24 | 25 | 26 | 27 | 28 |
|  | dimethyl-valeronitrile) | | | | | |
|  | 1,1'-azobiscyclo-hexane-1-carbonitrile | 2.0 | — | 2.0 | 2.0 | 2.0 |
| Properties | nonvolatile content (%) | 50 | 50 | 50 | 50 | 50 |
|  | concentration of active hydrogen | 1.9 | 2.6 | 1.9 | 2.1 | 0 |
|  | concentration of tertiary amino group | 1.9 | 2.6 | 1.9 | 3.2 | 3.5 |
|  | concentration of active methylene group | 0 | 2.6 | 0 | 1.0 | 0 |
|  | number average molecular | 3090 | 3170 | 3080 | 1880 | 1500 |

[1] Placcel FM-4: trade name, made by Daicel Chemical Industries (lactone-modified methacrylate monomer)

TABLE 7

|  |  | Synthesis Example | | | | | |
|---|---|---|---|---|---|---|---|
|  |  | 29 | 30 | 31 | 32 | 33 | 34 |
| Component T No. |  | T-1 | T-2 | T-3 | T-4 | T-5 | T-6 |
| Resin compo-sition | solvent xylene | 40 | 40 | 39 | 39 | 40 | 40 |
|  | decanol | 4.3 | 2.3 | 3.0 | 3.0 | 2.6 | 1.2 |
|  | ε-caprolactone | 35.5 | 33.0 | 36.6 | 35.2 | 28.5 | 31.7 |
|  | butylglycidyl ether | 15.3 | 22.1 | 8.8 | — | — | — |
|  | phenylglycidyl ether | — | — | — | 10.2 | — | — |
|  | Cardula E-10 [1] | — | — | — | — | 16.0 | 15.9 |
|  | phthalic anhydride | — | — | 8.4 | 8.4 | 8.5 | 8.5 |
|  | dibutyl tin dilaurate | — | — | 0.1 | 0.1 | 0.1 | 0.1 |

TABLE 7-continued

|  |  | Synthesis Example | | | | | |
|---|---|---|---|---|---|---|---|
|  |  | 29 | 30 | 31 | 32 | 33 | 34 |
|  | dimethyl benzyl-amine | — | — | 0.8 | 0.8 | — | — |
|  | sodium methylate | 0.1 | 0.1 | — | — | — | — |
|  | tolylene diisocyanate | 4.8 | 2.5 | 3.3 | 3.3 | 4.3 | 2.6 |
| Prop-er-ties | nonvolatile content (%) | 60 | 60 | 60 | 60 | 60 | 60 |
|  | number average molecular weight | 2200 | 4200 | 3200 | 3200 | 2500 | 4000 |

[1] Cardula E-10: trade name, made by Shell Chemical Co., Ltd. (glycidylester of versatic acid)

TABLE 8

|  |  |  | Comparative Synthesis Example | |
|---|---|---|---|---|
|  |  |  | 1 | 2 |
| Macromer No. |  |  | A-24 | A-25 |
| Resin composition | solvent | xylene | 39.9 | 39.9 |
|  | (Y + A) components | butanol | 9.3 | — |
|  |  | decanol | — | 0.4 |
|  |  | phthalic anhydride | — | 0.7 |
|  |  | Cardula E-10 [1] | — | 1.5 |
|  |  | ε-caprolactone | 14.3 | 56.7 |
|  |  | dibutyl tin dilaurate | 0.1 | 0.1 |
|  |  | tolylene diisocyanate | 21.8 | 0.4 |
|  |  | 2-hydroxyethyl methacrylate | 14.6 | 0.3 |
| Design | r |  | 0 | 2.0 |
|  | s |  | 1.0 | 200.0 |
| Properties | number average molecular weight | | 490 | 23000 |
|  | nonvolatile content (%) | | 60.1 | 60.1 |

[1] Cardula E-10: trade name, made by Shell Chemical Co., Ltd. (glycidylester of versatic acid)

TABLE 9

| Comparative Synthesis Example |  |  | 3 | Comparative Synthesis Example |  |  | 4 |
|---|---|---|---|---|---|---|---|
| Macromer No. |  |  | A-26 | Macromer No. |  |  | A-27 |
| Solvent |  | xylene | 397.6 |  |  | xylene | 397.48 |
| Resin composition | (Y + A) components | butanol | 92.9 | (Y + A) components | decanol | 4.1 |
|  |  | ε-caprolactone | 143.1 |  | phthalic anhydride | 152.9 |
|  |  | dibutyl tin dilaurate | 1.2 |  | butylglycidyl ether | 141.0 |
|  |  | phthalic anhydride | 185.8 |  | tetramethyl ammonium chloride | 0.12 |
|  |  | 4-methoxy phenol | 1.2 |  | dibutyl tin dilaurate | 1.2 |
|  |  | glycidyl methacrylate | 178.2 |  | ε-caprolactone | 294.5 |
|  |  |  |  |  | phthalic anhydride | 3.8 |
|  |  |  |  |  | 4-methoxy phenol | 1.2 |
|  |  |  |  |  | glycidyl methacrylate | 3.7 |
| Properties | number average molecular weight | | 478 |  | number average molecular weight | | 23000 |
|  | nonvolatile content (%) | | 60 |  | nonvolatile content (%) | | 60 |
| Design value | s | | 1 |  | r + s | | 141 |

TABLE 10(a)

|  |  |  | Example | | | | | | | | | |
|---|---|---|---|---|---|---|---|---|---|---|---|---|
|  |  |  | 1 | 2 | 3 | 4 | 5 | 6 | 7 | 8 | 9 |
| Pigment Dispersing agent No. |  |  | 1 | 2 | 3 | 4 | 5 | 6 | 7 | 8 | 9 |
| composition | solvent | xylene | 39.0 | 37.7 | 38.4 | 38.4 | 36.5 | 35.6 | 41.2 | 41.5 | 39.8 |
|  |  | cyclohexane | — | — | — | — | — | — | — | — | — |
|  | (Y + A) components | macromer No. | A-1 | A-2 | A-3 | A-4 | A-5 | A-6 | A-7 | A-8 | A-9 |
|  |  | compounding amount | 55.2 | 56.5 | 55.8 | 55.8 | 57.7 | 58.6 | 53.0 | 52.7 | 54.4 |
|  | components X | dimethyl aminoethyl methacrylate | — | — | — | — | — | — | — | — | — |
|  |  | dimethyl aminopropyl methacrylamide | — | — | — | — | — | — | — | — | — |
|  |  | dimethyl aminopropyl acrylamide | 5.0 | 5.0 | 5.0 | 5.0 | 5.0 | 5.0 | 5.0 | 5.0 | 5.0 |
|  |  | 4-vinyl pyridine | — | — | — | — | — | — | — | — | — |
|  |  | 1-vinyl imidazole | — | — | — | — | — | — | — | — | — |
|  | components Z | stylene | — | — | — | — | — | — | — | — | — |
|  |  | n-butylmethacrylate | — | — | — | — | — | — | — | — | — |
|  |  | dimethyl acrylamide | — | — | — | — | — | — | — | — | — |
|  |  | 2-hydroxyethyl methacrylate | — | — | — | — | — | — | — | — | — |

TABLE 10(a)-continued

| | | | Example | | | | | | | | | |
|---|---|---|---|---|---|---|---|---|---|---|---|---|
| | | | 1 | 2 | 3 | 4 | 5 | 6 | 7 | 8 | 9 |
| | | acrylic acid | — | — | — | — | — | — | — | — | — |
| | initiator | 2,2'-azobis(2,4-dimethylvaleronitrile) | 0.8 | 0.8 | 0.8 | 0.8 | 0.8 | 0.8 | 0.8 | 0.8 | 0.8 |
| | | 1,1'-azobiscyclohexane-1-carbonitrile | — | — | — | — | — | — | — | — | — |
| | solid | (Y + A) components | 87.5 | 87.5 | 87.5 | 87.5 | 87.5 | 87.5 | 87.5 | 87.5 | 87.5 |
| | content | components X | 12.5 | 12.5 | 12.5 | 12.5 | 12.5 | 12.5 | 12.5 | 12.5 | 12.5 |
| | ratio | components Z | — | — | — | — | — | — | — | — | — |
| Properties | amine value | | 45 | 45 | 45 | 45 | 45 | 45 | 45 | 45 | 45 |
| | hydroxyl value | | 0 | 0 | 0 | 0 | 0 | 0 | 0 | 0 | 0 |
| | acid value | | 0 | 0 | 0 | 0 | 0 | 0 | 0 | 0 | 0 |
| | number average molecular weight | | 1730 | 3000 | 2400 | 2300 | 2000 | 3000 | 2500 | 2600 | 2500 |
| | nonvolatile content (%) | | 40 | 40 | 40 | 40 | 40 | 40 | 40 | 40 | 40 |

TABLE 10(b)

| | | | Example | | | | | | | | |
|---|---|---|---|---|---|---|---|---|---|---|---|
| | | | 10 | 11 | 12 | 13 | 14 | 15 | 16 | 17 | 18 |
| Pigment Dispersing agent No. | | | 10 | 11 | 12 | 4 | 14 | 15 | 16 | 17 | 18 |
| composition | solvent | xylene | 38.9 | 37.8 | 39.2 | 38.6 | 40.2 | 38.1 | 39.4 | 38.6 | 40.2 |
| | | cyclohexane | — | — | — | — | — | — | — | — | — |
| | (Y + A) | macromer No. | A-10 | A-11 | A-12 | A-13 | A-14 | A-15 | A-16 | A-17 | A-18 |
| | components | compounding amount | 55.3 | 56.4 | 55.0 | 55.6 | 54.0 | 56.1 | 54.8 | 55.6 | 54.0 |
| | components | dimethyl aminoethyl methacrylate | — | — | — | — | — | — | — | — | — |
| | X | dimethyl aminopropyl methacrylamide | — | — | — | — | — | — | — | — | — |
| | | dimethyl aminopropyl acrylamide | 5.0 | 5.0 | 5.0 | 5.0 | 5.0 | 5.0 | 5.0 | 5.0 | 5.0 |
| | | 4-vinyl pyridine | — | — | — | — | — | — | — | — | — |
| | | 1-vinyl imidazole | — | — | — | — | — | — | — | — | — |
| | components | styrene | — | — | — | — | — | — | — | — | — |
| | Z | n-butylmethacrylate | — | — | — | — | — | — | — | — | — |
| | | dimethyl acrylamide | — | — | — | — | — | — | — | — | — |
| | | 2-hydroxyethyl methacrylate | — | — | — | — | — | — | — | — | — |
| | | acrylic acid | — | — | — | — | — | — | — | — | — |
| | initiator | 2,2'-azobis(2,4-dimethylvaleronitrile) | 0.8 | 0.8 | 0.8 | 0.8 | 0.8 | 0.8 | 0.8 | 0.8 | 0.8 |
| | | 1,1'-azobiscyclohexane-1-carbonitrile | — | — | — | — | — | — | — | — | — |
| | solid | (Y + A) components | 87.5 | 87.5 | 87.5 | 87.5 | 87.5 | 87.5 | 87.5 | 87.5 | 87.5 |
| | content | components X | 12.5 | 12.5 | 12.5 | 12.5 | 12.5 | 12.5 | 12.5 | 12.5 | 12.5 |
| | ratio | components Z | — | — | — | — | — | — | — | — | — |
| Properties | amine value | | 45 | 45 | 45 | 45 | 45 | 45 | 45 | 45 | 45 |
| | hydroxyl value | | 0 | 0 | 0 | 0 | 0 | 0 | 0 | 0 | 0 |
| | acid value | | 0 | 0 | 0 | 0 | 0 | 0 | 0 | 0 | 0 |
| | number average molecular weight | | 2450 | 2500 | 2400 | 2500 | 2350 | 2300 | 2400 | 2500 | 2500 |
| | nonvolatile content (%) | | 40 | 40 | 40 | 40 | 40 | 40 | 40 | 40 | 40 |

TABLE 11

| | | | Example | | | | | | | | | | |
|---|---|---|---|---|---|---|---|---|---|---|---|---|---|
| | | | 19 | 20 | 21 | 22 | 23 | 24 | 25 | 26 | 27 | 28 | 29 |
| Pigment Dispersing agent No. | | | 19 | 20 | 21 | 22 | 23 | 24 | 25 | 26 | 27 | 28 | 29 |
| composition | solvent | xylene | 38.0 | 38.3 | 37.0 | 36.8 | 37.4 | 39.2 | 39.3 | 39.2 | 39.0 | 39.1 | 19.0 |
| | | cyclohexane | — | — | — | — | — | — | — | — | — | — | 20.0 |
| | (Y + A) | macromer No. | A-3 | A-3 | A-3 | A-3 | A-3 | A-3 | A-3 | A-3 | A-3 | A-3 | A-3 |
| | components | compounding amount | 55.8 | 55.0 | 58.4 | 59.0 | 58.5 | 53.1 | 52.3 | 53.6 | 53.7 | 51.8 | 52.0 |
| | components | dimethyl aminoethyl methacrylate | 5.0 | — | — | — | — | 5.0 | — | — | — | — | — |
| | X | dimethyl aminopropyl methacrylamide | — | 5.5 | — | — | — | — | — | — | — | — | — |
| | | dimethyl aminopropyl acrylamide | — | — | — | — | 3.3 | 6.7 | — | 4.4 | 4.4 | 4.4 | 2.2 |
| | | 4-vinyl pyridine | — | — | 3.4 | — | — | — | — | — | — | — | — |
| | | 1-vinyl imidazole | — | — | — | 3.0 | — | — | — | — | — | — | — |
| | components | styrene | — | — | — | — | — | — | 1.5 | — | — | — | — |
| | Z | n-butylmethacrylate | — | — | — | — | — | — | 0.7 | — | — | — | — |
| | | dimethyl acrylamide | — | — | — | — | — | — | — | 2.0 | — | — | — |
| | | 2-hydroxyethyl methacrylate | — | — | — | — | — | — | — | — | 1.9 | — | — |
| | | acrylic acid | — | — | — | — | — | — | — | — | — | 3.1 | 5.2 |
| | initiator | 2,2'-azobis(2,4-dimethylvaleronitrile) | 1.2 | 1.2 | 1.2 | 1.2 | 0.8 | 1.0 | 1.2 | 0.8 | 1.0 | 1.6 | 1.6 |
| | | 1,1'-azobiscyclohexane-1-carbonitrile | — | — | — | — | — | — | — | — | — | — | — |
| | solid | (Y + A) components | 87.5 | 86.2 | 91.5 | 92.5 | 91.7 | 83.2 | 82.0 | 84.0 | 84.2 | 81.2 | 81.5 |
| | content | components X | 12.5 | 13.8 | 8.5 | 7.5 | 8.3 | 16.8 | 12.5 | 11.0 | 11.0 | 11.0 | 5.5 |
| | ratio | components Z | — | — | — | — | — | — | 5.5 | 5.0 | 4.8 | 7.8 | 13.0 |
| Properties | amine value | | 44.7 | 45.4 | 45.9 | 44.8 | 29.7 | 60.2 | 44.7 | 39.6 | 39.6 | 39.6 | 19.8 |
| | hydroxyl value | | 0 | 0 | 0 | 0 | 0 | 0 | 0 | 0 | 20.5 | 0 | 0 |
| | acid value | | 0 | 0 | 0 | 0 | 0 | 0 | 0 | 0 | 0 | 60.4 | 101.3 |
| | number average molecular weight | | 2600 | 2200 | 2400 | 2700 | 2400 | 2300 | 2800 | 3000 | 2900 | 3100 | 3300 |
| | nonvolatile content (%) | | 40 | 40 | 40 | 40 | 40 | 40 | 40 | 40 | 40 | 40 | 40 |

TABLE 12

|  |  | Example 30 | Example 31 | Example 32 | Example 33 | Example 34 |
|---|---|---|---|---|---|---|
| Pigment dispersing agent No. |  | 30 | 31 | 32 | 33 | 34 |
| composition solvent | xylene | 35.9 | 35.9 | 35.9 | 36.9 | 37.2 |
| (Y + A) or (Q + B) components | macromer No. | A-1 | A-2 | A-3 | A-22 | A-23 |
|  | compounding amount | 58.3 | 58.3 | 58.3 | 55.8 | 55.0 |
| components X | dimethyl aminopropyl acrylamide | 5.0 | 5.0 | 5.0 | 5.0 | 5.0 |
| components Z | stylene | — | — | — | 1.5 | — |
|  | 2-hydroxyethyl methacrylate | — | — | — | — | 2.0 |
| initiator | 2,2'-azobis(2,4-dimethylvaleronitrile) | 0.8 | 0.8 | 0.8 | 0.8 | 0.8 |
| solid content ratio | (Y + A) components or (Q + B) components | 87.5 | 87.5 | 87.5 | 83.7 | 82.5 |
|  | components X | 12.5 | 12.5 | 12.5 | 12.5 | 12.5 |
|  | components Z | — | — | — | 3.8 | 5.0 |
| Properties | amine value mgKOH/g | 45.0 | 45.0 | 45.0 | 45.0 | 45.0 |
|  | hydroxyl value mgKOH/g | 0 | 0 | 0 | 0 | 21.6 |
|  | number average molecular weight | 3300 | 2500 | 2100 | 2700 | 3400 |
|  | nonvolatile content (%) | 40 | 40 | 40 | 40 | 40 |

TABLE 13

|  |  | Example 35 | Example 36 | Example 37 | Example 38 | Example 39 | Example 40 | Example 41 | Example 42 | Comparative Example 11 |
|---|---|---|---|---|---|---|---|---|---|---|
| Pigment dispersing agent No. |  | 35 | 36 | 37 | 38 | 39 | 40 | 41 | 42 | 53 |
| composition solvent | xylene | 19.9 | 19.8 | 19.7 | 20.4 | 19.6 | 19.6 | 19.9 | 19.7 | 21.3 |
|  | cyclohexane | 10 | 10 | 10 | 10 | 10 | 10 | 10 | 10 | 10 |
| component S | component S No. | S-1 | S-2 | S-3 | S-4 | S-3 | S-3 | S-3 | S-3 | S-5 |
|  | compounding amount | 20.8 | 21.2 | 21.5 | 17.7 | 19.6 | 19.6 | 20.8 | 22.2 | 11.7 |
| component T | component T No. | T-1 | T-1 | T-2 | T-1 | T-3 | T-4 | T-5 | T-6 | T-1 |
|  | compounding amount | 49.3 | 49.0 | 48.8 | 51.9 | 50.8 | 50.8 | 49.3 | 48.1 | 57.0 |
| Properties | nonvolatile content (%) | 40 | 40 | 40 | 40 | 40 | 40 | 40 | 40 | 40 |
|  | mol ratio of S/T | 1/4 | 1/4 | 1/2 | 1/3 | 1/3 | 1/3 | 1/3.5 | 1/2 | 1/4 |
|  | amine value | 29.3 | 38.7 | 29.3 | 39.7 | 26.7 | 26.7 | 28.5 | 30.4 | 28.7 |
|  | sum of hydroxyl value and active methylene value (mgKOH/g) | 9.4 | 20.0 | 19.5 | 6.3 | 13.3 | 13.3 | 11.9 | 20.3 | 0 |
| Reaction conditions | temperature (°C.) | 30 | 50 | 30 | 50 | 50 | 50 | 50 | 50 | 50 |
|  | time (Hr) | 2 | 3 | 2 | 3 | 3 | 3 | 3 | 3 | 3 |

TABLE 14

|  |  | Comparative Example 1 | Comparative Example 2 | Comparative Example 3 | Comparative Example 4 | Comparative Example 5 | Comparative Example 6 |
|---|---|---|---|---|---|---|---|
| Pigment dispersing agent No. |  | 43 | 44 | 45 | 46 | 47 | 48 |
| composition solvent | xylene | 20.0 | 20.0 | 33.2 | 30.0 | 25.0 | 11.3 |
|  | cyclohexane | 16.4 | 16.4 | — | 21.7 | 24.8 | 10.0 |
| (Y + A) components | macromer No. | A-21 | A-22 | A-5 | A-5 | A-19 | A-20 |
|  | compounding amount | 57.2 | 57.2 | 65.2 | 20.1 | 43.1 | 71.8 |
| components X | dimethyl aminoethyl methacrylate | 5.6 | 5.6 | — | — | — | — |
|  | diemthyl aminopropyl methacrylamide | — | — | — | — | 4.1 | 6.8 |
|  | dimethyl aminopropyl acrylamide | — | — | 0.8 | 27.8 | — | — |
| initiator | 2,2'-azobis(2,4-dimethyl-valeronitrile) | 0.8 | 0.8 | 0.8 | 0.4 | 3.0 | — |
|  | 1,1'-azobiscyclohexane-1-carbonitrile | — | — | — | — | — | 0.1 |
| solid content ratio | (Y + A) components | 86.0 | 86.0 | 98.0 | 30.5 | 86.3 | 86.4 |
|  | components X | 14.0 | 14.0 | 2.0 | 69.5 | 13.7 | 13.6 |
|  | components Z | — | — | — | — | — | — |
| Properties | amine value | 50 | 50 | 7.2 | 250 | 45.1 | 44.9 |
|  | number average molecular weight | 2000 | 10000 | 4000 | 4000 | 900 | 120000 |
|  | nonvolatile content (%) | 40 | 40 | 40 | 40 | 30 | 50 |

TABLE 14

| | | | Comparative Example | | | | | |
|---|---|---|---|---|---|---|---|---|
| | | | 1 | 2 | 3 | 4 | 5 | 6 |
| Pigment dispersing agent No. | | | 43 | 44 | 45 | 46 | 47 | 48 |
| composition | solvent | xylene | 20.0 | 20.0 | 33.2 | 30.0 | 25.0 | 11.3 |
| | | cyclohexane | 16.4 | 16.4 | — | 21.7 | 24.8 | 10.0 |
| | (Y + A) | macromer No. | A-21 | A-22 | A-5 | A-5 | A-19 | A-20 |
| | components | compounding amount | 57.2 | 57.2 | 65.2 | 20.1 | 43.1 | 71.8 |
| | components X | dimethyl aminoethyl methacrylate | 5.6 | 5.6 | — | — | — | — |
| | | dimethyl aminopropyl methacrylamide | — | — | — | — | 4.1 | 6.8 |
| | | dimethyl aminopropyl acrylamide | — | — | 0.8 | 27.8 | — | — |
| | initiator | 2,2'-azobis(2,4-dimethyl-valeronitrile) | 0.8 | 0.8 | 0.8 | 0.4 | 3.0 | — |
| | | 1,1'-azobiscyclohexane-1-carbonitrile | — | — | — | — | — | 0.1 |
| | solid content ratio | (Y + A) components | 86.0 | 86.0 | 98.0 | 30.5 | 86.3 | 86.4 |
| | | components X | 14.0 | 14.0 | 2.0 | 69.5 | 13.7 | 13.6 |
| | | components Z | — | — | — | — | — | — |
| Properties | amine value | | 50 | 50 | 7.2 | 250 | 45.1 | 44.9 |
| | number average molecular weight | | 2000 | 10000 | 4000 | 4000 | 900 | 120000 |
| | nonvolatile content (%) | | 40 | 40 | 40 | 40 | 30 | 50 |

TABLE 15

| | | | Comparative Example | | | |
|---|---|---|---|---|---|---|
| | | | 7 | 8 | 9 | 10 |
| Pigment dispersing agent No. | | | 49 | 50 | 51 | 52 |
| composition | solvent | xylene | 33.2 | 51.6 | 35.9 | 35.9 |
| | (Y + A) components | macromer No. | A-1 | A-1 | A-4 | A-5 |
| | | compounding amount | 65.2 | 20.2 | 58.3 | 58.3 |
| | component X | dimethyl aminopropyl acrylamide | 0.8 | 27.8 | 5.0 | 5.0 |
| | initiator | 2,2'-azobis(2,4-dimethyl-valeronitrile) | 0.8 | 0.4 | 0.8 | 0.8 |
| | solid content ratio | (Y + A) components | 98.0 | 30.3 | 87.5 | 87.5 |
| | | component X | 2.0 | 69.7 | 12.5 | 12.5 |
| Properties | amine value mgKOH/g | | 7.2 | 250.0 | 45.0 | 45.0 |
| | hydroxyl value mgKOH/g | | 0 | 0 | 0 | 0 |
| | number average molecular weight | | 4000 | 1500 | 850 | 35000 |
| | nonvolatile content (%) | | 40 | 40 | 40 | 40 |

TABLE 16(a)

| | | Application Example | | | | | | | | | |
|---|---|---|---|---|---|---|---|---|---|---|---|
| | | 1 | 2 | 3 | 4 | 5 | 6 | 7 | 8 | 9 | 10 |
| Pigment dispersing agent No. 1) | | 1 | 1 | 1 | 1 | 2 | 3 | 4 | 5 | 6 | 7 |
| Acrylic resin No. 2) | | AC-1 | — | — | — | — | AC-2 | AC-2 | — | AC-2 | AC-2 |
| Polyester resin No. 3) | | — | PE-1 | PE-2 | PE-2 | PE-1 | — | — | PE-1 | — | — |
| Formulation of dispersion paste | pigment dispersion agent | 20 | 20 | 20 | 10 | 20 | 20 | 2.7 | 10 | 10 | 20 |
| | Acrylic resin | 28.3 | — | — | — | — | 28.3 | 28.2 | — | 35 | 28.3 |
| | Polyester resin | — | 28.3 | 28.3 | 35 | 28.3 | — | — | 35 | — | — |
| | xylene | 15.9 | 25.3 | 25.3 | 28 | 25.4 | 15.9 | 7.6 | 28 | 17.5 | 15.9 |
| | cellosolve acetate | 15.8 | — | — | — | — | 15.8 | 7.5 | — | 17.5 | 15.8 |
| | butyl cellosolve | — | 6.4 | 6.4 | 7 | 6.3 | — | — | 7 | — | — |
| | Rubicron Red 500RG 4) | — | — | — | 20 | — | — | — | — | — | — |
| | Paliogen Violet L-5080 5) | — | — | — | — | — | 20 | — | — | — | 20 |
| | Paliogen Maroon L-3820 6) | 20 | 20 | 20 | — | — | — | — | — | — | — |
| | Novoperm Red F3RK-70 7) | — | — | — | — | 20 | — | — | 20 | 20 | — |
| | Titanium dioxide JR-603 8) | — | — | — | — | — | — | 54 | — | — | — |
| Properties of paste | amount of pigment dispersing agent added (%) 9) | 40 | 40 | 40 | 20 | 40 | 40 | 2 | 20 | 20 | 40 |
| | viscosity of dispersion paste (PS) 10) | 5.2 | 8.3 | 7.2 | 3.0 | 6.2 | 5.3 | 10.0 | 1.4 | 2.2 | 5.4 |
| | stability of dispersion paste 11) | good | good | good | good | good | good | good | good | good | good |
| Formulation of paint | dispersion paste | 40 | 40 | 40 | 40 | 40 | 40 | 50 | 40 | 40 | 40 |
| | acrylic resin | 30 | — | — | — | — | 30 | 24.4 | — | 30 | 30 |
| | polyester resin | — | 30 | 30 | 30 | 30 | — | — | 30 | — | — |
| | melamine resin 12) | 20 | 20 | 20 | 20 | 20 | 20 | 16.9 | 20 | 20 | 20 |
| | leveling agent 13) | 0.6 | 0.6 | 0.6 | 0.6 | 0.6 | 0.6 | 0.6 | 0.6 | 0.6 | 0.6 |
| | thinner 14) | 9.4 | 9.4 | 9.4 | 9.4 | 9.4 | 9.4 | 8.1 | 9.4 | 9.4 | 9.4 |
| Properties of paint film | 30° specular gloss 15) | 88 | 81 | 85 | 90 | 87 | 85 | 84 | 87 | 83 | 84 |
| | humidity resistance 16) | good | good | good | good | good | good | good | good | good | good |
| | weather resistance 17) | 85 | 85 | 85 | 85 | 90 | 87 | 84 | 89 | 88 | 86 |
| | non-yellowing property 18) | good | good | good | good | good | good | good | good | good | good |

TABLE 16(a)-continued

| | | Application Example | | | | | | | | | |
|---|---|---|---|---|---|---|---|---|---|---|---|
| | | 1 | 2 | 3 | 4 | 5 | 6 | 7 | 8 | 9 | 10 |
| | adhesion property 19) | good | good | good | good | good | good | good | good | good | good |

TABLE 16(b)

| | | Application Example | | | | | | | | |
|---|---|---|---|---|---|---|---|---|---|---|
| | | 11 | 12 | 13 | 14 | 15 | 16 | 17 | 18 | 19 |
| Pigment dispersing agent No. 1) | | 8 | 9 | 10 | 11 | 12 | 13 | 14 | 15 | 16 |
| Acrylic resin No. 2) | | AC-2 | AC-2 | AC-2 | AC-2 | AC-2 | AC-2 | AC-2 | AC-2 | AC-2 |
| Polyester resin No. 3) | | — | — | — | — | — | — | — | — | — |
| Formulation of dispersion paste | pigment dispersion agent | 2.7 | 20 | 2.7 | 20 | 20 | 10 | 10 | 2.7 | 2.7 |
| | Acrylic resin | 28.2 | 28.3 | 28.2 | 28.3 | 28.3 | 35 | 35 | 28.2 | 28.2 |
| | Polyester resin | — | — | — | — | — | — | — | — | — |
| | xylene | 7.6 | 15.9 | 7.6 | 15.9 | 15.9 | 17.5 | 17.5 | 7.6 | 7.6 |
| | cellosolve acetate | 7.5 | 15.8 | 7.5 | 15.8 | 15.8 | 17.5 | 17.5 | 7.5 | 7.5 |
| | butyl cellosolve | — | — | — | — | — | — | — | — | — |
| | Rubicron Red 500RG 4) | — | — | — | — | — | — | — | — | — |
| | Paliogen Violet L-5080 5) | — | 20 | — | 20 | 20 | — | — | — | — |
| | Paliogen Maroon L-3820 6) | — | — | — | — | — | — | — | — | — |
| | Novoperm Red F3RK-70 7) | — | — | — | — | — | 20 | 20 | — | — |
| | Titanium dioxide JR-603 8) | 54 | — | 54 | — | — | — | — | 54 | 54 |
| Properties of paste | amount of pigment dispersing agent added (%) 9) | 2 | 40 | 2 | 40 | 40 | 20 | 20 | 2 | 2 |
| | viscosity of dispersion paste (PS) 10) | 9.9 | 5.1 | 10.1 | 5.3 | 5.4 | 2.3 | 2.2 | 10.1 | 10.0 |
| | stability of dispersion paste 11) | good | good | good | good | good | good | good | good | good |
| Formulation of paint | dispersion paste | 50 | 40 | 50 | 40 | 40 | 40 | 40 | 50 | 50 |
| | acrylic resin | 24.4 | 30 | 24.4 | 30 | 30 | 30 | 30 | 24.4 | 24.4 |
| | polyester resin | — | — | — | — | — | — | — | — | — |
| | melamine resin 12) | 16.9 | 20 | 16.9 | 20 | 20 | 20 | 20 | 16.9 | 16.9 |
| | leveling agent 13) | 0.6 | 0.6 | 0.6 | 0.6 | 0.6 | 0.6 | 0.6 | 0.6 | 0.6 |
| | thinner 14) | 8.1 | 9.4 | 8.1 | 9.4 | 9.4 | 9.4 | 9.4 | 8.1 | 8.1 |
| Properties of paint film | 30° specular gloss 15) | 85 | 84 | 84 | 84 | 84 | 84 | 85 | 84 | 84 |
| | humidity resistance 16) | good | good | good | good | good | good | good | good | good |
| | weather resistance 17) | 85 | 87 | 85 | 87 | 86 | 87 | 87 | 84 | 85 |
| | non-yellowing property 18) | good | good | good | good | good | good | good | good | good |
| | adhesion property 19) | good | good | good | good | good | good | good | good | good |

TABLE 17(a)

| | | Application Example | | | | | | |
|---|---|---|---|---|---|---|---|---|
| | | 20 | 21 | 22 | 23 | 24 | 25 | 26 |
| Pigment dispersing agent No. 1) | | 17 | 18 | 19 | 20 | 21 | 22 | 23 |
| Acrylic resin No. 2) | | AC-2 | AC-2 | AC-2 | AC-2 | AC-2 | AC-2 | AC-2 |
| Polyester resin No. 3) | | — | — | — | — | — | — | — |
| Formulation of dispersion paste | pigment dispersion agent | 20 | 20 | 10 | 10 | 2.7 | 2.7 | 10 |
| | Acrylic resin | 28.3 | 28.3 | 35 | 35 | 28.2 | 28.2 | 35 |
| | polyester resin | — | — | — | — | — | — | — |
| | xylene | 15.9 | 15.9 | 17.5 | 17.5 | 7.6 | 7.6 | 17.5 |
| | cellosolve acetate | 15.8 | 15.8 | 17.5 | 17.5 | 7.5 | 7.5 | 17.5 |
| | butyl cellosolve | — | — | — | — | — | — | — |
| | Rubicron Red 500RG 4) | — | — | — | — | — | — | — |
| | Paliogen Violet L-5080 5) | 20 | 20 | — | — | — | — | — |
| | Paliogen Maroon L-3820 6) | — | — | — | — | — | — | — |
| | Novoperm Red F3RK-70 7) | — | — | 20 | 20 | — | — | 20 |
| | Titanium dioxide JR-603 8) | — | — | — | — | 54 | 54 | — |
| Properties of paste | amount of pigment dispersing agent added (%) 9) | 40 | 40 | 20 | 20 | 2 | 2 | 20 |
| | viscosity of dispersion paste (PS) 10) | 5.4 | 5.2 | 2.4 | 2.3 | 9.8 | 9.9 | 2.3 |
| | stability of dispersion paste 11) | good | good | good | good | good | good | good |
| Formulation of paint | dispersion paste | 40 | 40 | 40 | 40 | 50 | 50 | 40 |
| | acrylic resin | 30 | 30 | 30 | 30 | 24.4 | 24.4 | 30 |
| | polyester resin | — | — | — | — | — | — | — |
| | melamine resin 12) | 20 | 20 | 20 | 20 | 16.9 | 16.9 | 20 |
| | leveling agent 13) | 0.6 | 0.6 | 0.6 | 0.6 | 0.6 | 0.6 | 0.6 |
| | thinner 14) | 9.4 | 9.4 | 9.4 | 9.4 | 8.1 | 8.1 | 9.4 |
| Properties of paint film | 30° specular gloss 15) | 86 | 86 | 86 | 86 | 84 | 84 | 85 |
| | humidity resistance 16) | good | good | good | good | good | good | good |
| | weather resistance 17) | 86 | 85 | 87 | 86 | 85 | 84 | 87 |
| | non-yellowing property 18) | good | good | good | good | good | good | good |
| | adhesion property 19) | good | good | good | good | good | good | good |

TABLE 17(b)

|  |  | Application Example | | | | | |
|---|---|---|---|---|---|---|---|
|  |  | 27 | 28 | 29 | 30 | 31 | 32 |
| Pigment dispersing agent No. 1) |  | 24 | 25 | 26 | 27 | 28 | 29 |
| Acrylic resin No. 2) |  | AC-2 | AC-2 | AC-2 | AC-2 | AC-2 | AC-2 |
| Polyester resin No. 3) |  | — | — | — | — | — | — |
| Formulation of dispersion paste | pigment dispersion agent | 10 | 10 | 10 | 20 | 2.7 | 2.7 |
|  | Acrylic resin | 35. | 35 | 35 | 28.3 | 28.2 | 28.2 |
|  | polyester resin | — | — | — | — | — | — |
|  | xylene | 17.5 | 17.5 | 17.5 | 15.9 | 7.6 | 7.6 |
|  | cellosolve acetate | 17.5 | 17.5 | 17.5 | 15.8 | 7.5 | 7.5 |
|  | butyl cellosolve | — | — | — | — | — | — |
|  | Rubicron Red 500RG 4) | — | — | — | — | — | — |
|  | Paliogen Violet L-5080 5) | — | — | — | — | — | — |
|  | Paliogen Maroon L-3820 6) | — | — | — | 20 | — | — |
|  | Novoperm Red F3RK-70 7) | 20 | 20 | 20 | — | — | — |
|  | Titanium dioxide JR-603 8) | — | — | — | — | 54 | 54 |
| Properties of paste | amount of pigment dispersing agent added (%) 9) | 20 | 20 | 20 | 40 | 2 | 2 |
|  | viscosity of dispersion paste (PS) 10) | 2.1 | 2.2 | 2.3 | 5.5 | 10.0 | 9.7 |
|  | stability of dispersion paste 11) | good | good | good | good | good | good |
| Formulation of paint | dispersion paste | 40 | 40 | 40 | 40 | 50 | 50 |
|  | acrylic resin | 30 | 30 | 30 | 30 | 24.4 | 24.4 |
|  | polyester resin | — | — | — | — | — | — |
|  | melamine resin 12) | 20 | 20 | 20 | 20 | 16.9 | 16.9 |
|  | leveling agent 13) | 0.6 | 0.6 | 0.6 | 0.6 | 0.6 | 0.6 |
|  | thinner 14) | 9.4 | 9.4 | 9.4 | 9.4 | 8.1 | 8.1 |
| Properties of paint film | 30° specular gloss 15) | 86 | 86 | 87 | 87 | 85 | 86 |
|  | humidity resistance 16) | good | good | good | good | good | good |
|  | weather resistance 17) | 86 | 87 | 86 | 86 | 84 | 85 |
|  | non-yellowing property 18) | good | good | good | good | good | good |
|  | adhesion property 19) | good | good | good | good | good | good |

TABLE 18

|  |  | Application Example | | | | | |
|---|---|---|---|---|---|---|---|
|  |  | 33 | 34 | 35 | 36 | 37 | 38 |
| Pigment dispersing agent No. 1) |  | 30 | 30 | 31 | 32 | 33 | 34 |
| Acrylic resin No. 2) |  | AC-1 | — | AC-2 | — | AC-1 | AC-1 |
| Polyester resin No. 3) |  | — | PE-1 | — | PE-2 | — | — |
| Formulation of dispersion paste | pigment dispersion agent | 20 | 20 | 10 | 10 | 20 | 3 |
|  | Acrylic resin | 28.3 | — | 35.0 | — | 28.3 | 28.3 |
|  | polyester resin | — | 28.3 | — | 35.0 | — | — |
|  | xylene | 15.9 | 15.9 | 17.5 | 17.5 | 15.9 | 3 |
|  | cellosolve acetate | 15.8 | 15.8 | 17.5 | 17.5 | 15.8 | 5.7 |
|  | Rubicron Red 500RG 4) | — | — | — | 20 | — | — |
|  | Paliogen Violet L-5080 5) | — | — | 20 | — | — | — |
|  | Paliogen Maroon L-3820 6) | 20 | 20 | — | — | 20 | — |
|  | Titanium dioxide JR-603 8) | — | — | — | — | — | 60 |
| Properties of paste | amount of pigment dispersing agent added (%) 9) | 40 | 40 | 20 | 20 | 40 | 5 |
|  | viscosity of dispersion paste (PS) 10) | 5.7 | 8.6 | 3.3 | 6.4 | 6.9 | 9.8 |
|  | stability of dispersion paste 11) | good | good | good | good | good | good |
| Formulation of paint | dispersion paste | 40 | 40 | 40 | 40 | 40 | 50 |
|  | acrylic resin | 30 | — | 30 | — | 40 | 24.4 |
|  | polyester resin | — | 30 | — | 30 | — | — |
|  | melamine resin 12) | 20 | 20 | 20 | 20 | 20 | 16.9 |
|  | leveling agent 13) | 0.6 | 0.6 | 0.6 | 0.6 | 0.6 | 0.6 |
|  | thinner 14) | 9.4 | 9.4 | 9.4 | 9.4 | 9.4 | 8.1 |
| Properties of paint film | 30° specular gloss 15) | 85 | 88 | 89 | 81 | 84 | 89 |
|  | humidity resistance 16) | good | good | good | good | good | good |
|  | weather resistance 17) | 85 | 85 | 85 | 80 | 82 | 85 |
|  | non-yellowing property 18) | good | good | good | good | good | good |
|  | adhesion property 19) | good | good | good | good | good | good |

TABLE 19(a)

|  |  | Comparative Application Example | | | | | | |
|---|---|---|---|---|---|---|---|---|
|  |  | 1 | 2 | 3 | 4 | 5 | 6 | 7 |
| Pigment dispersing agent No. 1) |  | 43 | 44 | 45 | 46 | 47 | 48 | 49 |
| Acrylic resin No. 2) |  | AC-2 | AC-2 | AC-2 | AC-2 | AC-2 | AC-2 | AC-1 |
| Polyester resin No. 3) |  | — | — | — | — | — | — | — |
| Formulation of dispersion paste | pigment dispersion agent | 20 | 20 | 20 | 20 | 27 | 16 | 20 |
|  | Acrylic resin | 28.3 | 28.3 | 28.3 | 28.3 | 28.3 | 28.3 | 28.3 |
|  | polyester resin | — | — | — | — | — | — | — |
|  | xylene | 15.9 | 15.9 | 15.9 | 15.9 | 12.4 | 17.9 | 15.9 |
|  | cellosolve acetate | 15.8 | 15.8 | 15.8 | 15.8 | 12.3 | 17.8 | 15.8 |
|  | butyl cellosolve | — | — | — | — | — | — | — |
|  | Rubicron Red 500RG 4) | — | — | — | — | — | — | — |

TABLE 19(a)-continued

| | | Comparative Application Example | | | | | | |
|---|---|---|---|---|---|---|---|---|
| | | 1 | 2 | 3 | 4 | 5 | 6 | 7 |
| | Paliogen Violet L-5080 5) | — | — | — | — | — | — | — |
| | Paliogen Maroon L-3820 6) | 20 | 20 | 20 | 20 | 20 | 20 | 20 |
| | Novoperm Red F3RK-70 7) | — | — | — | — | — | — | — |
| | Titanium dioxide JR-603 8) | — | — | — | — | — | — | — |
| Properties of paste | amount of pigment dispersing agent added (%) 9) | 40 | 40 | 40 | 40 | 40 | 40 | 40 |
| | viscosity of dispersion paste (PS) 10) | 65 | 80 | 90 | 70 | 75 | 101 | 87 |
| | stability of dispersion paste 11) | bad | bad | bad | bad | bad | bad | bad |
| Formulation of paint | dispersion paste | — | — | — | — | — | — | — |
| | acrylic resin | — | — | — | — | — | — | — |
| | polyester resin | — | — | — | — | — | — | — |
| | melamine resin 12) | — | — | — | — | — | — | — |
| | leveling agent 13) | — | — | — | — | — | — | — |
| | thinner 14) | — | — | — | — | — | — | — |
| Properties of paint film | 30° specular gloss 15) | — | — | — | — | — | — | — |
| | humidity resistance 16) | — | — | — | — | — | — | — |
| | weather resistance 17) | — | — | — | — | — | — | — |
| | non-yellowing property 18) | — | — | — | — | — | — | — |
| | adhesion property 19) | — | — | — | — | — | — | — |

TABLE 19(b)

| | | Comparative Application Example | | | | | | |
|---|---|---|---|---|---|---|---|---|
| | | 8 | 9 | 10 | 11 | 12 | 13 | 14 |
| Pigment dispersing agent No. 1) | | 50 | 51 | 52 | 53 | — | 54 | 55 |
| Acrylic resin No. 2) | | AC-1 | AC-1 | AC-1 | AC-1 | AC-2 | — | AC-1 |
| Polyester resin No. 3) | | — | — | — | — | — | PE-2 | — |
| Formulation of paste | pigment dispersion agent | 20 | 20 | 20 | 20 | — | 1.2 | 1.4 |
| | Acrylic resin | 28.3 | 28.3 | 28.3 | 28.3 | 41.7 | — | 20.8 |
| | polyester resin | — | — | — | — | — | 20.8 | 20.2 |
| | xylene | 15.9 | 15.9 | 15.9 | 15.9 | 19.2 | 30.4 | 20.0 |
| | cellosolve acetate | 15.8 | 15.8 | 15.8 | 15.8 | 19.1 | — | — |
| | butyl cellosolve | — | — | — | — | — | 10.0 | — |
| | Rubicron Red 500RG 4) | — | — | — | — | — | — | — |
| | Paliogen Violet L-5080 5) | — | — | — | — | — | — | — |
| | Paliogen Maroon L-3820 6) | 20 | 20 | 20 | 20 | 20 | — | — |
| | Novoperm Red F3RK-70 7) | — | — | — | — | — | — | — |
| | Titanium dioxide JR-603 8) | — | — | — | — | — | 37.6 | 37.6 |
| Properties of paste | amount of pigment dispersing agent added (%) 9) | 40 | 40 | 40 | 40 | — | 2 | 2 |
| | viscosity of dispersion paste (PS) 10) | 69 | 75 | 108 | 65 | 108 | 5 | 7 |
| | stability of dispersion paste 11) | bad | bad | bad | bad | bad | good | good |
| Formulation of paint | dispersion paste | — | — | — | 40 | 40 | 59.1 | 59.1 |
| | acrylic resin | — | — | — | 30 | 30 | — | 20.1 |
| | polyester resin | — | — | — | — | — | 20.1 | — |
| | melamine resin 12) | — | — | — | 20 | 20 | 13.9 | 13.9 |
| | leveling agent 13) | — | — | — | 0.6 | 0.6 | 0.5 | 0.5 |
| | thinner 14) | — | — | — | 9.4 | 9.4 | 6.4 | 6.4 |
| Properties of paint film | 30° specular gloss 15) | — | — | — | 52 | 35 | 87 | 86 |
| | humidity resistance 16) | — | — | — | bad | good | good | good |
| | weather resistance 17) | — | — | — | 53 | 88 | 88 | 87 |
| | non-yellowing property 18) | — | — | — | good | good | bad | bad |
| | adhesion property 19) | — | — | — | bad | good | good | good |

TABLE 20

| | | Application Example | | | | | | | | | |
|---|---|---|---|---|---|---|---|---|---|---|---|
| | | 39 | 40 | 41 | 42 | 43 | 44 | 45 | 46 | 47 | 48 |
| Pigment dispersing agent No. 1) | | 39 | 40 | 41 | 42 | 43 | 40 | 41 | 46 | 47 | 48 |
| Acrylic resin No. 2) | | AC-1 | — | AC-2 | AC-2 | AC-2 | AC-2 | — | AC-2 | — | — |
| Polyester resin No. 3) | | — | PE-1 | — | — | — | — | PE-1 | — | PE-1 | PE-2 |
| Formulation of dispersion paste | pigment dispersion agent | 20 | 20 | 10 | 20 | 20 | 2.7 | 10 | 10 | 20 | 20 |
| | Acrylic resin | 28.3 | — | 35 | 28.3 | 28.3 | 28.2 | — | 35 | — | — |
| | Polyester resin | — | 28.3 | — | — | — | — | 35 | — | 28.3 | 28.3 |
| | xylene | 15.9 | 25.4 | 17.5 | 15.9 | 15.9 | 7.6 | 28 | 17.5 | 25.4 | 25.4 |
| | cellosolve acetate | 15.8 | — | 17.5 | 15.8 | 15.8 | 7.5 | — | 17.5 | — | — |
| | butyl cellosolve | — | 6.3 | — | — | — | — | 7.0 | — | 6.3 | 6.3 |
| | Rubicron Red 500RG 4) | — | — | — | — | — | — | — | — | — | — |
| | Paliogen Violet L-5080 5) | — | 20 | — | — | 20 | — | — | — | 20 | — |
| | Paliogen Maroon L-3820 6) | 20 | — | — | 20 | — | — | — | — | — | — |
| | Novoperm Red F3RK-70 7) | — | — | 20 | — | — | — | 20 | 20 | — | 20 |
| | Titanium dioxide JR-603 8) | — | — | — | — | — | 54 | — | — | — | — |
| Properties | amount of pigment dispersing | 40 | 40 | 20 | 40 | 40 | 2 | 20 | 20 | 40 | 40 |

TABLE 20-continued

|  |  | Application Example | | | | | | | | | |
|---|---|---|---|---|---|---|---|---|---|---|---|
|  |  | 39 | 40 | 41 | 42 | 43 | 44 | 45 | 46 | 47 | 48 |
| of | agent added (%) 9) |  |  |  |  |  |  |  |  |  |  |
| paste | viscosity of dispersion paste (PS) 10) | 5.2 | 6.2 | 1.5 | 6.0 | 5.3 | 10.0 | 1.4 | 2.2 | 8.3 | 3.0 |
|  | stability of dispersion paste 11) | good | good | good | good | good | good | good | good | good | good |
| Formula- | dispersion paste | 40 | 40 | 40 | 40 | 40 | 50 | 40 | 40 | 40 | 40 |
| tion of | acrylic resin | 30 | — | 30 | 30 | 30 | 24.4 | — | 30 | — | — |
| paint | polyester resin | — | 30 | — | — | — | — | 30 | — | 30 | 30 |
|  | melamine resin 12) | 20 | 20 | 20 | 20 | 20 | 16.9 | 20 | 20 | 20 | 20 |
|  | leveling agent 13) | 0.6 | 0.6 | 0.6 | 0.6 | 0.6 | 0.6 | 0.6 | 0.6 | 0.6 | 0.6 |
|  | thinner 14) | 9.4 | 9.4 | 9.4 | 9.4 | 9.4 | 8.1 | 9.4 | 9.4 | 9.4 | 9.4 |
| Properties | 30° specular gloss 15) | 88 | 87 | 88 | 86 | 85 | 84 | 87 | 83 | 81 | 93 |
| of | humidity resistance 16) | good | good | good | good | good | good | good | good | good | good |
| paint | weather resistance 17) | 85 | 90 | 86 | 87 | 87 | 84 | 89 | 88 | 85 | 85 |
| film | non-yellowing property 18) | good | good | good | good | good | good | good | good | good | good |
|  | adhesion property 19) | good | good | good | good | good | good | good | good | good | good |

Note:
1) Pigment dispersing agents according to the invention (Tables 10-15)
2) Acrylic resin for film formation in Table 2
3) Polyester resin for film formation in Table 1
4) Rubicron Red 500RG (quinacridone series organic pigment, made by Toso K.K., trade name)
5) Paligen Violet L-5080 (thioindigo series organic pigment, made by BASF AG, trade name)
6) Paliogen Maroon L-3820 (perylene series organic pigment, BASF AG, trade name)
7) Novoperm Red F3RK-70 (azo series organic pigment, made by Hoechst, trade name)
8) titanium dioxide JR-603 (made by Teikoku Kako K.K., trade name)
9) amount as a solid content of pigment dispersing agent added to pigment (%)
10) past viscosity: measured by means of B-type viscometer (trade name, made by Tokyo Keiki K.K.) at 20° C. (unit: PS)
11) After the dispersion paste was left to stand at 50° C. for 5 days, the viscosity was measured at 20° C. by means of B-type viscometer. When the ratio of initial viscosity to viscosity after 5 days is within a range of 0.9-1.4, the storage stability is good, while when it is not less than 2.0, the property is poor.
12) melamine resin: Uban 220 (made by Mitsui Toatsu Chemicals, Inc., trade name, nonvolatile content: 60%)
13) leveling agent: Modaflow (made by Monsanto Co., trade name, 10% xyelen solution)
14) thinner for dilution: cellosolve acetate/xylene = 50/50 (%)
15) Doligon goniophotometer (made by Hunter Laboratories)
16) Humidity test: After the test sheet was held at 50° C. ± 1° C. in a moisture atmosphere of not less than 95% RH for 120 hours, it was taken out from the above atmosphere and left to stand for 24 hours. The good or bad humidity resistance was evaluated by the size and density of the resulting blister.
17) The 60° specular gloss was measured by means of a sunshine carbon weathermeter after the sheet was exposed for 1,000 hours according to a method for weather acceleration test of JIS D0205-7.6. The property was represented by the gloss retention (%).
18) Resistance to yellowing: The good or bad resistance to yellowing was judged by visually observing the yellowing of paint film after the sheet was coated with the paint.
19) Adhesion property: The good or bad adhesion property was evaluated by a peeling state of a cellophane tacky tape (JIS Z1522) when a central portion of the test sheet was cut into square meshes of 11 parallel lines at a distance of 1 mm so as to arrive to the sheet surface through the paint film by means of a cutter knife (JIS K5400 (1979)-6.15) and then the tape was adhered thereonto and then peeled off upward.

What is claimed is:

1. A pigment dispersing agent represented by the following general formula (I) or (II):

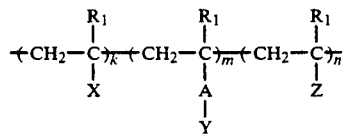

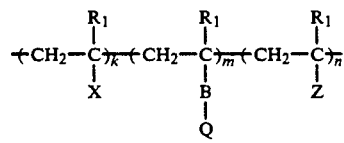

wherein $R_1$ is a hydrogen atom or a methyl group, X is a tertiary amino group and/or a nitrogen-containing heterocyclic ring group selected from

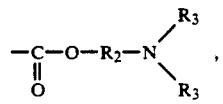

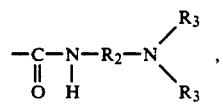

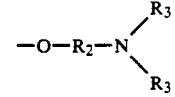

wherein $R_2$ is an alkylene group having a carbon number of 1-8, and $R_3$ is an alkyl group having a carbon number of 1-4, an imidazole group, a pyridine group, a carbazole group, a quinoline and $R_3$ is an alkyl group having a carbon number of 1-4, an imidazole group, a pyridine group, a carbazole group, a quinoline group and an N-alkyl piperidine group, each of A and B is a coupling group, each of Y and Q is a polyester compound residue and/or a polyester polyether compound residue, Z is a hydrogen atom, an alkyl group having a carbon number of 1-4, a halogen atom, a phenyl group, a nitrile group,

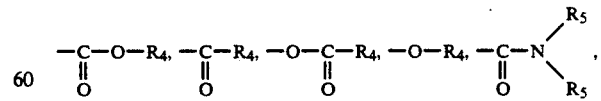

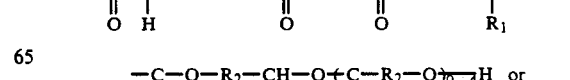

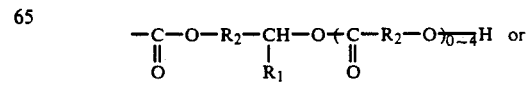

-continued $$-\underset{\underset{O}{\|}}{C}-O-R_2-O-R_3$$

wherein $R_4$ is an alkyl group having a carbon number of 1-18, $R_5$ is a hydrogen atom, or an alkyl group or an alkoxy group having a carbon number 1-4, k is an integer of 1-200, m is an integer of 1-100 and n is an integer of 0-200, and having a number average molecular weight of 1,000-100,000 and an amine value of 10-200 mgKOH/g.

2. The pigment dispersing agent according to claim 1, wherein A in the formula (I) is a coupling group represented by the following general formula (1), (2) or (3)

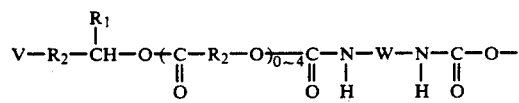  (1)

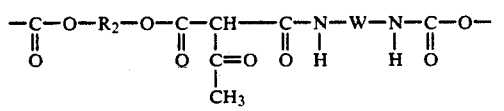  (2)

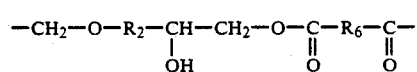  (3)

wherein V is

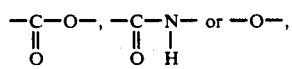

W is a residue of disocyanate compound and $R_6$ is a residue of acid anhydride having a carbon number of 2-6, and B in the formula (II) is a coupling group represented by the following general formula (4) or (5)

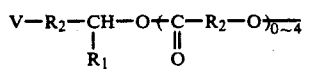  (4)

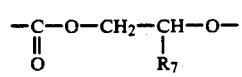  (5)

wherein V is as above, wherein $R_7$ is a phenyl group, or an alkyl group or an aromatic group having a carbon number of 3-19,

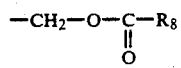

wherein $R_8$ is an alkyl group or an aromatic group having a carbon number of 3-18 or $-CH_2-O-R_9$ (wherein $R_9$ is an alkyl group or an aromatic group having a carbon number of 1-18.

3. The pigment dispersing agent according to claim 1, wherein said polymer compound (i) having one hydroxyl group in its terminal is a polymer compound represented by the following general formula (III), (IV) or (V):

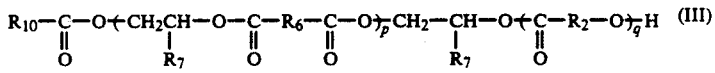  (III)

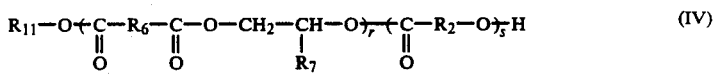  (IV)

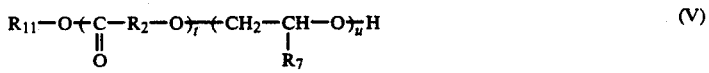  (V)

wherein $R_{10}$ is an alkyl group or an aromatic group having a carbon number of 1-20, $R_{11}$ is a saturated aliphatic, alicyclic or aromatic group having a carbon number of 1-18, p and q are $1 \leq p+q \leq 200$, r and s are $1 \leq r+s \leq 200$, and t and u are $1 \leq t+u \leq 200$.

4. The pigment dispersing agent according to claim 1, wherein Y in the formula (I) is a residue of a polyester polyether compound obtained by ring-opening copolymerization of a lactone compound and a monoepoxy compound using monovalent alcohol and/or monocarboxylic acid as an initiator, and having a number average molecular weight of 500-20,000 and/or a residue of a polyester compound obtained by ring-opening copolymerization of a lactone compound, a monoepoxy compound and an acid anhydride using monovalent alcohol and/or monocarboxylic acid as an initiator, and having a number average molecular weight of 500-20,000.

5. The pigment dispersing agent according to claim 1, wherein Q in the formula (II) is a residue of a polyester polyether compound obtained by ring-opening copolymerization of a lactone compound and a monoepoxy compound and having a number average molecular weight of 500-20,000 and/or a residue of a polyester compound obtained by ring-opening copolymerization of a lactone compound, a monoepoxy compound and an acid anhydride and having a number average molecular weight of 500-20,000.

6. A pigment dispersing agent being a product obtained by reacting an acrylic polymer having a tertiary amino group concentration of 0.9-18 mol/kg, an active hydrogen concentration of 0.18-9.0 mol/kg and/or an active methylene group concentration of 0.18-9.0 mol/kg and a number average molecular weight of 800-30,000 (component S) with a polymer compound having one isocyanate group in its terminal and a number average molecular weight of 500-20,000 obtained through a reaction of a ring-opened copolymer between lactone compound having a carbon number of 3-17 and monoepoxy compound using monovalent alcohol as an initiator, a ring-opened copolymer among lactone compound, monoepoxy compound and acid anhydride using monovalent alcohol and/or monocarboxylic acid as an initiator and a diisocyanate compound (component T) at a mol ratio of component S to component T of 1:1-1:40, and having a number average molecular weight of 1,000-100,000, a sum of hydroxyl value and active methylene value of 5-200 mgKOH/g and an amine value of 10-200 mgKOH/g.

7. The pigment dispersing agent according to claim 6, wherein the component S is an acrylic copolymer obtained by copolymerizing a tertiary amino group containing copolymerizable monomer and/or a copolymerizable monomer having a basic functional group with nitrogen-containing heterocyclic ring, an active hydrogen containing copolymerizable monomer and/or an active methylene group containing copolymerizable monomer, and a copolymerizable monomer other than the above.

8. A pigment dispersing agent being a copolymer having a number average molecular weight of 1,000-100,000 and an amine value of 10-200 mgKOH/g, which is obtained by copolymerizing (a) 40-97% by weight of a macromer having vinyl group or isopropenyl group in its terminal and a number average molecular weight of 500-20,000 obtained by blocking a half of (i) a polymer compound having one hydroxyl group in its terminal with (ii) a diisocyanate compound and then blocking the remaining half of the polymer compound with (iii) a hydroxyl group containing polymerizable monomer and/or an active methylene group containing polymerizable monomer with (b) 3-60% by weight of a tertiary amino group containing copolymerizable monomer and/or a copolymerizable monomer having a basic functional group with nitrogen-containing heterocyclic ring and (c) 0-47% by weight of copolymerizable monomer other than the above components (a) and (b).

* * * * *